(12) United States Patent
Hornstein et al.

(10) Patent No.: US 11,388,388 B2
(45) Date of Patent: Jul. 12, 2022

(54) SYSTEM AND METHOD FOR PROCESSING THREE DIMENSIONAL IMAGES

(71) Applicant: Looking Glass Factory, Inc., Brooklyn, NY (US)

(72) Inventors: Alexis Hornstein, Brooklyn, NY (US); Shawn Michael Frayne, Brooklyn, NY (US); Lee Shiu Pong, Brooklyn, NY (US); Matthew Collins, Brooklyn, NY (US); Caleb Johnston, Brooklyn, NY (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

(21) Appl. No.: 17/539,954

(22) Filed: Dec. 1, 2021

(65) Prior Publication Data
US 2022/0174261 A1    Jun. 2, 2022

Related U.S. Application Data

(60) Provisional application No. 63/120,034, filed on Dec. 1, 2020.

(51) Int. Cl.
*G06T 19/00* (2011.01)
*H04N 13/305* (2018.01)
(Continued)

(52) U.S. Cl.
CPC .......... *H04N 13/305* (2018.05); *G06N 20/00* (2019.01); *G06T 7/33* (2017.01); *G06T 7/557* (2017.01);
(Continued)

(58) Field of Classification Search
CPC .. H04N 13/305; H04N 13/128; H04N 13/383; G06N 20/00; G06T 7/33; G06T 7/557; G06T 2207/20081
See application file for complete search history.

(56) References Cited

U.S. PATENT DOCUMENTS 8,760,566 B2 *  6/2014  Pitts .................. H04N 7/01
                                             348/349
8,995,785 B2 *  3/2015  Knight ............. H04N 5/232945
                                             382/275
(Continued)

FOREIGN PATENT DOCUMENTS

EP       3454098 A1    3/2019
WO    2015104239 A2    7/2015
(Continued)

OTHER PUBLICATIONS

"Deep Frame The World's Largest Mixed Reality Display Technology", https://www.realfiction.com/solutions/deepframe.
(Continued)

*Primary Examiner* — Howard D Brown, Jr.
(74) *Attorney, Agent, or Firm* — Jeffrey Schox; Randy Mehlenbacher

(57) ABSTRACT

A system and method for lightfield communication can be configured to receive one or more images, determine one or more features in the one or more images, and generate a lightfield image from the one or more images where at least one of the one or more features is in a focal plane of the lightfield image.

22 Claims, 15 Drawing Sheets

(51) Int. Cl.
  *G06T 7/557* (2017.01)
  *H04N 13/128* (2018.01)
  *G06T 7/33* (2017.01)
  *G06N 20/00* (2019.01)
  *H04N 13/383* (2018.01)

(52) U.S. Cl.
  CPC ......... *H04N 13/128* (2018.05); *H04N 13/383* (2018.05); *G06T 2207/20081* (2013.01)

(56) References Cited

U.S. PATENT DOCUMENTS

| | | |
|---|---|---|
| 9,060,158 B2 | 6/2015 | Shibagami |
| 9,307,228 B2 | 4/2016 | Chen et al. |
| 9,456,141 B2 * | 9/2016 | Fishman ............ H04N 5/23218 |
| 9,530,195 B2 | 12/2016 | Ng |
| 9,581,821 B2 | 2/2017 | McDowall et al. |
| 9,609,212 B2 | 3/2017 | Takenaka et al. |
| 9,916,517 B2 | 3/2018 | Raghoebardajal et al. |
| 9,977,248 B1 | 5/2018 | Xie |
| 10,129,524 B2 * | 11/2018 | Ng ........................ G06T 15/205 |
| 10,521,952 B2 * | 12/2019 | Ackerson ............ G06T 7/0002 |
| 11,048,101 B2 | 6/2021 | MacNamara et al. |
| 11,119,353 B2 | 9/2021 | Blum |
| 11,226,493 B2 | 1/2022 | Joseph et al. |
| 2002/0141635 A1 | 10/2002 | Swift et al. |
| 2005/0089212 A1 | 4/2005 | Mashitani et al. |
| 2010/0201790 A1 | 8/2010 | Son et al. |
| 2010/0245535 A1 | 9/2010 | Mauchly |
| 2011/0292190 A1 | 12/2011 | Kim et al. |
| 2013/0113981 A1 | 5/2013 | Knight et al. |
| 2014/0334745 A1 * | 11/2014 | Fleischer ............ G02B 27/0075 382/284 |
| 2015/0022887 A1 | 1/2015 | Larson et al. |
| 2015/0023563 A1 | 1/2015 | Koppal |
| 2015/0249817 A1 | 9/2015 | Roelen et al. |
| 2016/0077422 A1 | 3/2016 | Wang et al. |
| 2016/0088285 A1 | 3/2016 | Sadi et al. |
| 2017/0208292 A1 | 7/2017 | Smits |
| 2017/0244948 A1 * | 8/2017 | Pang ................... H04N 5/22541 |
| 2018/0020204 A1 * | 1/2018 | Pang ................... H04N 5/22541 |
| 2018/0035134 A1 * | 2/2018 | Pang ................... H04N 13/156 |
| 2018/0059783 A1 | 3/2018 | Van Hoff et al. |
| 2018/0089903 A1 * | 3/2018 | Pang ................... H04N 13/161 |
| 2018/0097867 A1 * | 4/2018 | Pang ................... H04N 19/124 |
| 2019/0018247 A1 | 1/2019 | Gao et al. |
| 2019/0019303 A1 | 1/2019 | Siver et al. |
| 2019/0035125 A1 | 1/2019 | Bellows et al. |
| 2019/0057957 A1 | 2/2019 | Xie |
| 2019/0094562 A1 | 3/2019 | Frayne et al. |
| 2019/0166359 A1 | 5/2019 | Lapstun |
| 2019/0213441 A1 | 7/2019 | Adato et al. |
| 2019/0244432 A1 | 8/2019 | Simonsen |
| 2020/0151860 A1 | 5/2020 | Safdarnejad et al. |
| 2020/0266252 A1 | 8/2020 | Cancel Olmo et al. |
| 2020/0272099 A1 | 8/2020 | Linville et al. |
| 2020/0368616 A1 | 11/2020 | Delamont |
| 2021/0013635 A1 | 1/2021 | Dumont |
| 2021/0065285 A1 | 3/2021 | Goldberg et al. |
| 2021/0065900 A1 | 3/2021 | Douglas et al. |
| 2021/0136354 A1 | 5/2021 | Valli et al. |

FOREIGN PATENT DOCUMENTS

| | | |
|---|---|---|
| WO | 2018227098 A1 | 12/2018 |
| WO | 2019209887 A1 | 10/2019 |

OTHER PUBLICATIONS

Goode, Lauren , "Google's Project Starline Videoconference Tech Wants to Turn You Into a Hologram", Wired, https://www.wired.com/story/google-project-starline/, May 18, 2021.

Kim, Kyung-Jin , et al., "Holographic augmented reality based on three-dimensional volumetric imaging for a photorealistic scene", Optics Express, vol. 28, No. 24 / 23, Nov. 2020.

Li, Hengjia , et al., "Perspective-consistent multifocus multiview 3D reconstruction of small objects", arXiv:1912.03005v1, Dec. 6, 2019.

Saw, John , "T-Mobile 5G Powers Immersive Experiences with Augmented Reality and Holographic Telepresence", https://www.t-mobile.com/news/network/t-mobile-5g-powers-immersive-experiences-with-augmented-reality-and-holographic-telepresence, Mar. 1, 2021.

Shi, Liang , et al., "Towards real-time photorealistic 3D holography with deep neural networks", Nature, vol. 591, Mar. 11, 2021.

* cited by examiner

SYSTEM AND METHOD FOR PROCESSING THREE DIMENSIONAL IMAGES

CROSS-REFERENCE TO RELATED APPLICATIONS

This application claims the benefit of U.S. Provisional Application No. 63/120,034, filed 01-Dec.-2020, which is incorporated in its entirety by this reference.

TECHNICAL FIELD

This invention relates generally to the holographic image field, and more specifically to a new and useful system and method in the holographic image field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
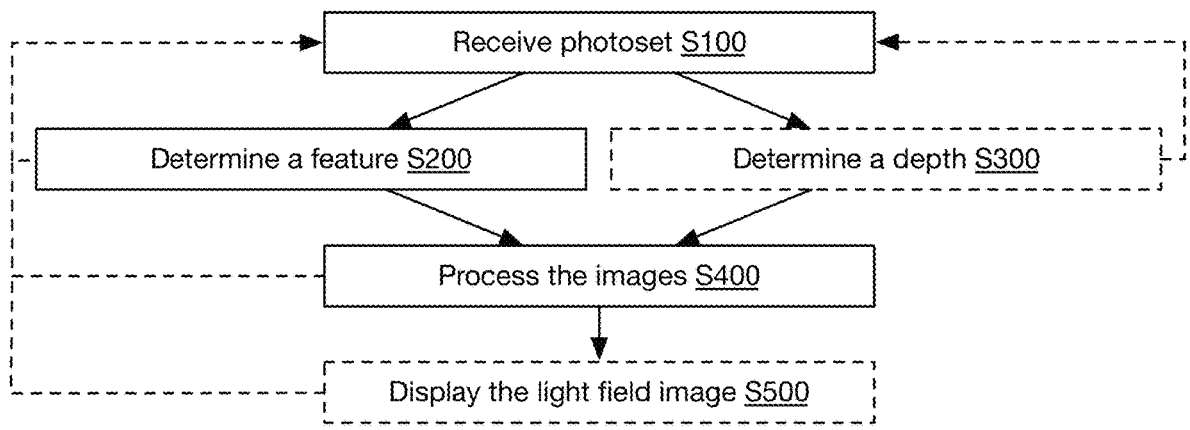
FIG. 2 is a schematic representation of the method.

As shown in FIG. 2, the method 20 can include receiving a photoset S100, determining a feature for each image of the photoset S200, and processing the images S400. The method can optionally include determining a depth associated with each image of the photoset S300, displaying a lightfield image associated with the photoset S500, and/or any step(s).

Figure 1:
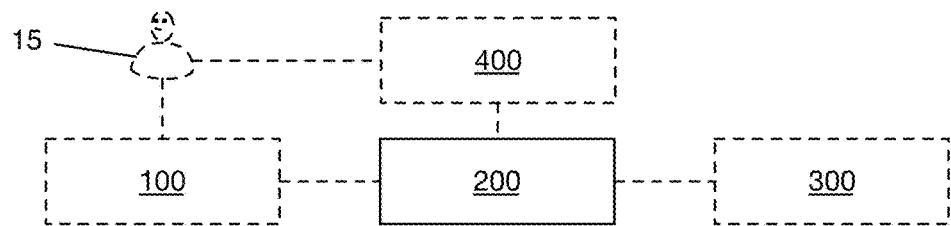
FIG. 1 is a schematic representation of the system.

As shown in FIG. 1, the system 10 can include a computing system 200. The system can optionally include an image acquisition system 100, a display 300, a sensor 400, and/or any component.

The system and method preferably function to process a photoset 110 to generate a lightfield image 117 (e.g., 3D image, holographic image, etc.). The photoset preferably includes a plurality of images, where each image 111 is preferably of a scene (e.g., including one or more subjects) from different perspectives. In an exemplary embodiment, the subjects 15 can be one or more humans (and/or portions thereof within the field of view of the image acquisition system). However, the subjects can be animals (e.g., pets, wildlife, livestock, etc.), plants, and/or any suitable subject(s). The images can be still images (e.g., photos), frames of a video (e.g., where each photoset can be a frame of a holographic video), computer generated images, and/or any suitable images. The lightfield image is preferably an image that can be perceived as three dimensional. The lightfield image preferably appears three dimensional to a plurality of viewers, but can appear holographic to a single viewer and/or any suitable viewers. The lightfield image preferably includes a plurality of views. The number of views in a lightfield image can be 2, 4, 6, 8, 10, 15, 20, 25, 30, 35, 40, 45, 50, 60, 70, 75, 80, 90, 100, 110, 120, 150, 200, 250, values therebetween, and/or greater than 250 views. The number of views is preferably equal to the number of images, but there can be more views than images or more images than views. The views can be processed images, rendered images, and/or any suitable images. However, the lightfield image can be any suitable image.

2. Benefits

Variations of the technology can confer several benefits and/or advantages.

First, the inventors have discovered that in some applications using feature detection to process a photoset can enhance a perceived quality of a lightfield image generated from the photoset. For example, the feature detection can assist with correcting a subject motion, a uniformity of lightfield image appearance (e.g., the consistency of viewing the lightfield image from different perspectives), maintain a focal plane at or near a subject's eye (e.g., to facilitate communication between a viewer and a subject), and/or otherwise enhance a quality or viewer experience with a lightfield image.

Second, the inventors have discovered that, in some variants of the system or method, by working with image data only (e.g., without generating depth information, without generating a render of a scene, etc.) embodiments of the technology can enable real- or near-real time (e.g., concurrent with image capture) focal plane adjustments to maintain a focal position of a subject within a lightfield image (e.g., during real time viewing such as teleconferencing, wildlife observation, etc.). Embodiments of the technology can still leverage image processing (e.g., image rendering, depth determination, existing depth information such as from a depth camera, etc.) for instance, to make slower adjustments to a focal plane, to make offline adjustments (e.g., for playback), in real time, and/or otherwise using processed images.

Third, variants of the technology can confer enhanced experiences during telecommunications. For example, maintaining a focus of a lightfield image at a face region of a subject (e.g., eyes, nose, mouth, ears, forehead, eyebrow, iris, eyelashes, temple, lips, chin, neck, hair, hairline, *glabella*, etc.) can led to enhanced perception (e.g., the perception of being in the same space, effective communication, stable communication, etc.) during a video call (e.g., one way or more than one way communication such as with a single viewer with a lightfield display and a single subject with an image capture system, each viewer includes a lightfield display and image capture system, etc.).

However, variants of the technology can confer any other suitable benefits and/or advantages.

3. System

As shown in FIG. 1, the system 10 can include a computing system 200. The system can optionally include an image acquisition system 100, a display 300, a sensor 400, and/or any component. In one embodiment, a viewer can be associated with a display and a subject 15 can be associated with an image acquisition system, whether either (or both) of the display and image acquisition system can have an associated computing system (e.g., facilitating communication between the subject(s) and viewer(s)). In another embodiment of the system, viewer(s) can be associated with an image acquisition system and a display (e.g., a viewer can also be a subject, a subject can also be a viewer). In another embodiment, one or more viewers can be associated with a display (e.g., a single display) and one or more subjects can be associated with an image acquisition system. However, the system can otherwise be arranged or distributed between viewer(s) and/or subject(s). The subject and viewer can be the same and/or different individuals. The subject and viewer can be collocated (e.g., in the same room, same geographical region, etc.) and/or remote (e.g., in different rooms, different geographical regions, etc.). Subject(s) and viewer(s) can each be singular or plural. For example, a single subject can be a presenter where the presenter is displayed to one or more viewers (e.g., 1 viewer; 2 viewers; 5 viewers; 10 viewers; 20 viewers; 50 viewers; 100 viewers; 500 viewers; 1000 viewers; 5000 viewers; 10,000 viewers; 50,000 viewers; 100,000 viewers; 1,000,000 viewers; 10,000,000 viewers; 100,000,000 viewers; 1,000,000,000 viewers; 10,000,000,000 viewers; values therebetween; etc.). Similarly, more than one subject (e.g., 1 subject, 2 subjects, 5 subjects, 10 subjects, 20 subjects, 50 subjects, 100 m subjects, 200 subjects, 500 subjects, 1000 subjects, values therebetween, etc.; a similar number of subjects and viewers; etc.) can be displayed to one or more viewers. However, any number of subjects and/or viewers can be present.

The system preferably functions to generate a lightfield image 117 with a target focal plane. The system can additionally or alternatively function to acquire one or more lightfield image (and/or photosets associated therewith) of a subject, determine a focal plane of the lightfield image, display the (focused) lightfield image, and/or can otherwise function.

The optional image acquisition system 100 functions to acquire images of a photoset 110 (e.g., a photoset associated with or used to generate a lightfield image). The image acquisition system preferably includes a plurality of cameras 150, 150', but can include a single camera and/or any suitable image sensors. The camera(s) can be a pinhole camera, a plenoptic camera (e.g., a lightfield camera), a single lens reflex (SLR) camera (e.g., a digital single lens reflex (DSLR) camera), a point-and-shoot camera, a digital camera, a field camera, a press camera, a rangefinder camera, a still camera, twin lens reflex (TLR) camera, a depth camera 155, a cellphone camera, a thermal camera, microscope (e.g., optical microscope, electron microscope, etc.), virtual camera (e.g., associated with a computer generated scene), scanners (e.g., images, feeds, etc. such as medical scans, CT scans, MRI scans, ultrasound, PET scans, radiographic techniques, tactile imaging, x-ray imaging, thermography, etc.; archaeological scans such as laser scans, CT scans, etc.; etc.), and/or any suitable type of camera. Each camera can be fixed (e.g., be mounted to have a static relation orientation, static absolute orientation, etc.) or moveable. The number of cameras in the image acquisition system is preferably the same as the number of views in the lightfield image. However, the number of cameras in the image acquisition system can be less than the number of views (e.g., when one or more cameras are mounted on a gantry, track, robot, motor, and/or other movement system and acquire images from more than one perspective, when one or more intermediate views are interpolated or generated, etc.) or greater than the number of views (e.g., to provide redundancy; to provide options for different perspectives such as above, below, wide view, narrow view, etc.; etc.).

The camera array can be a one-dimensional camera array (e.g., where the image sensor for each camera of the camera array is aligned to a reference axis such as a horizontal reference axis, a vertical reference axis, a straight reference line, a curved reference line, along an edge of a display, etc.), a two dimensional camera array (e.g., where the cameras are arranged on a two-dimensional grid, a rectilinear grid, a curvilinear grid, etc.), a three dimensional camera array (e.g., where the cameras are placed with a predetermined arrangement in three dimensional space; to match a pixel or screen shape such as to define a spherical spatial distribution to match a spherical screen or pixel of a display; etc.), and/or otherwise be arranged. The number of cameras in the camera array can depend on viewer parameters (e.g., the number of viewers; the distance such as an average distance, optimal viewing distance, focal distance, maximal distance, minimal distance, etc. between the viewer and the display; etc.), an environmental parameter (e.g., a distance of a subject from the image capture system, a number of subjects, etc.), views (e.g., the number of views that can be displayed, the number of views that need to be displayed for the viewers to perceive the scene as three dimensional or with predetermined quality, etc.), a camera parameter (e.g., the camera frame rate, the camera resolution, the camera field of view, a stereo-camera baseline, frame rate, image resolution, etc.), a computing system property (e.g., bandwidth of information transfer, processing bandwidth, etc.), and/or depend on any property.

Each camera is preferably synchronized (e.g., acquires an image and/or frame within 100 ms of the other cameras), but the cameras can be unsynchronized. The image size (e.g., view size, image resolution, etc.) is preferably the same for each camera (e.g., same size optical sensor for each camera, same pixel pitch, same pixel arrangement, etc.), but can be different (e.g., different optical sensor for each camera, different pixel pitch, different pixel arrangement, etc.). The image acquisition system is preferably calibrated (e.g., camera pose for each camera known, intrinsic parameters for each camera known, extrinsic parameters for each camera known, etc.), but can be uncalibrated. In a first example an image acquisition system can be a camera array such as a camera array as disclosed in U.S. patent application No. 17/073,927, filed 19-Oct.-2020 titled "SYSTEM AND METHOD FOR LIGHTFIELD CAPTURE" which is incorporated in its entirety by this reference. In a second example an image acquisition system can be a camera (or plurality of cameras) that are mounted on a rail (or otherwise configured to move along a predetermined path) that captures images at predetermined positions, at predetermined times, or otherwise captures images along the path. In a third example, an image acquisition system can be a camera of a user device (e.g., smart phone), where the images are captured with free motion of the camera. However, any image acquisition system can be used.

The optional display(s) 300 functions to display lightfield images (and/or holographic videos). The display can optionally display any suitable image and/or view. The displayed lightfield image(s) are preferably perceived as three dimensional (3D), but can additionally or alternatively be 2.5D, 2D, 1D, and/or have any suitable appearance. The lightfield images are preferably perceived as 3D without the use of a headset or auxiliary equipment (e.g., without using stereoscopic glasses). However, the lightfield images can be perceived as (and/or perception can be enhanced by) 3D using a headset or auxiliary equipment and/or otherwise be perceived as 3D. The display is preferably configured to display the lightfield images to a plurality of viewers (e.g., without requiring any viewers to have a headset or auxiliary equipment), but can be configured to display the lightfield images to a single viewer, and/or to any suitable viewers. The display can include one or more: light sources, optical elements (e.g., lenses; polarizers; waveplates; filters such as neutral density filters, color filters, etc.; beam steerers; liquid crystals; etc.), parallax generators, optical volumes, and/or any suitable components. In specific examples, the display can be as any suitable display as disclosed in U.S. Pat. No. 10,191,295 entitled 'ADVANCED RETROREFLECTING AERIAL DISPLAYS' filed on 05-Jan.-2018, U.S. patent application Ser. No. 17/328,076 entitled 'SUPERSTEREOSCOPIC DISPLAY WITH ENHANCED OFF-ANGLE SEPARATION' filed on 24 May 2021, U.S. patent application Ser. No. 17/326,857 entitled 'SYSTEM AND METHOD FOR HOLOGRAPHIC IMAGE DISPLAY' filed on 21 May 2021, and/or U.S. patent application Ser. No. 17/332,479 entitled 'SYSTEM AND METHOD FOR HOLOGRAPHIC DISPLAYS' filed 27 May 2021, each of which is incorporated herein in its entirety by this reference. In an illustrative example, a display can include a light source (e.g., a pixelated light source, LED, OLED, etc.), a parallax generator (e.g., lenticular lens, 1D lenticular lens, parallax barrier, etc.) optically coupled to the light source that, with the light source, generates a light output having viewing angle dependency; and an optical volume optically coupled to the lenticular lens (e.g., a free space optical volume, an optical volume defined by a frame, a block of optical material, etc.).

The display can be a single focal plane 305 display or a multifocal plane display (e.g., a display that includes a reflector to introduce a second focal plane). When the display is a multifocal plane display, a plurality of features can be focused (e.g., each focal plane of the multifocal plane display). The focal plane preferably refers to a zero or near zero parallax point of the display, but can otherwise be defined. The focal plane(s) can depend on the display size, pixel pitch, parallax generator pitch, lenticular focal length, and/or depend on any suitable characteristics of the display.

However, any display can be used.

In variants including a plurality of displays, each display can be the same or different from the other displays.

In variants where a display and image acquisition system are connected or otherwise collocated, the image acquisition system is preferably mounted above the display, but can be mounted along a side of the display, along a bottom of the display, within the display region (e.g., cameras can be embedded proximal the light source), separate from the display (e.g., mounted in the same environment such as within a threshold distance of the viewer and with an arbitrary or semi-arbitrary arrangement or distance from the display), and/or can otherwise be arranged.

The computing system 200 functions to process a photoset (and/or images thereof), generate lightfield image(s) and/or video(s), control the image acquisition system and/or display, and/or perform any function(s). The computing system can be local (e.g., to the image acquisition system, to a camera of the image acquisition system, to each camera of the image acquisition system, to a display, etc.), remote (e.g., cloud computing, server, network, etc.), and/or distributed (e.g., between a local and a remote computing system, between a display computing system and an image acquisition system computing system, etc.). The computing system can be in communication with the image acquisition system, a subset of cameras of the image acquisition system, the display(s), and/or with any suitable components.

The computing system can include one or more feature modules 210, alignment modules 220, artificial intelligence modules 230, communication modules 240, and/or any suitable modules or components.

Figure 5:
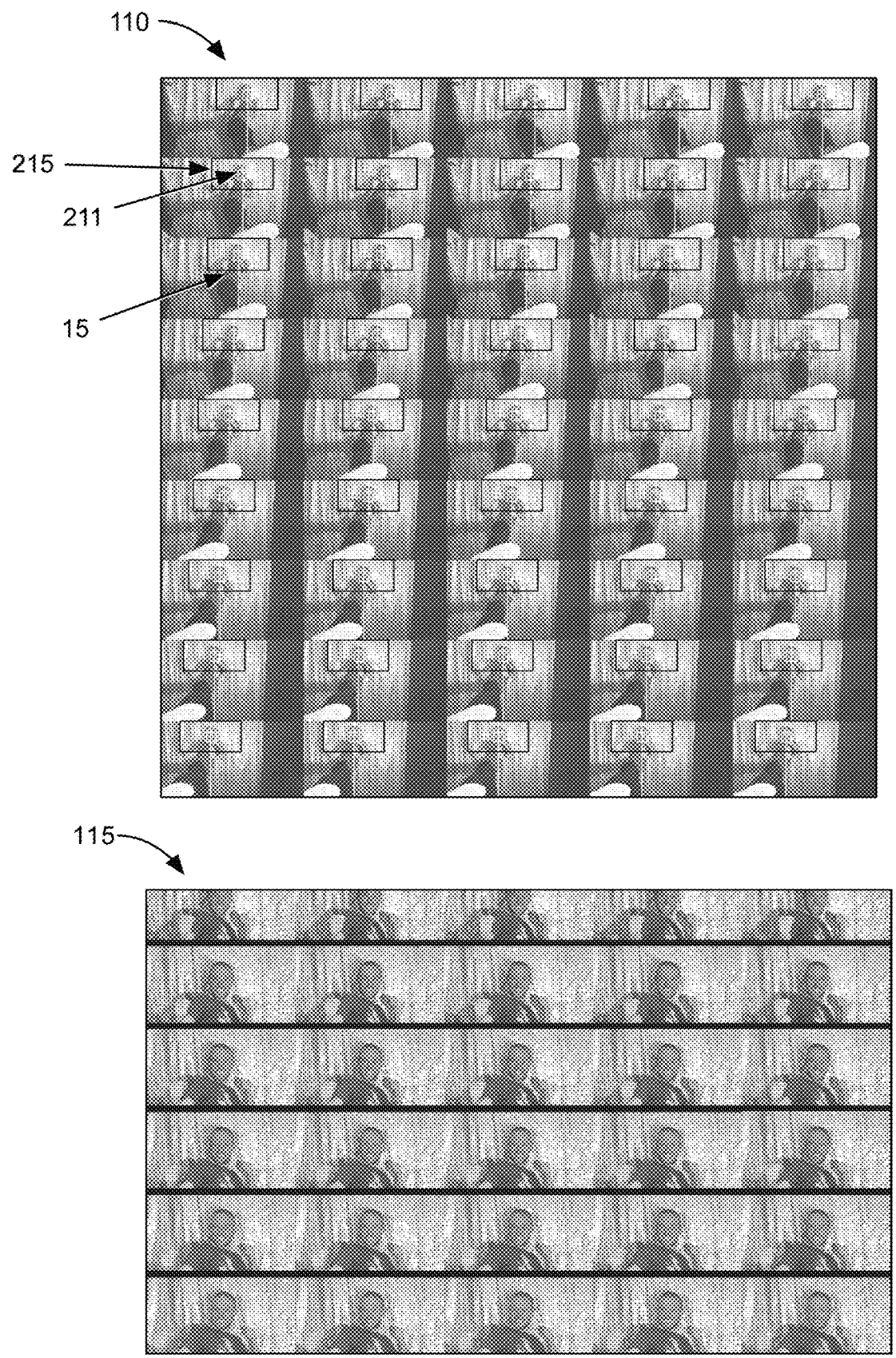
FIG. 5 is a schematic representation of an example of aligning a photoset.

The feature module(s) 210 preferably function to detect or identify one or more feature 211 of the photoset (and/or lightfield image generated therefrom). Feature(s) are preferably a face-region of a subject, but can include a head region of a subject, a body region of a subject, and/or any suitable features. The features can be specific structures (e.g., points, edges, corners, objects, etc.) and/or neighborhoods within images of the photoset. The neighborhoods are preferably the same size and/or shape between images, but can be different sizes and/or shapes between images. The neighborhoods can be square, rectangular, round, oval, diamond, heart, pear, oblong, squircle, stadium, and/or can have any suitable shape. The neighborhood size can depend on the feature size, depend on a distance between the feature and the image acquisition system, depend on a display (e.g., display resolution), depend on a computing system (e.g., data transfer bandwidth, processor bandwidth, etc.), depend on the image acquisition system (e.g., a camera resolution, a number of cameras, etc.), be fixed (e.g., constant size), depend on tracking information (e.g., viewer gaze, user gaze, viewer eye pose, viewer head pose, sensor data, etc.), and/or can otherwise be determined. When the neighborhood extends beyond an image boundary, the image can be filled in any manner (e.g., with extra pixels that are black, white, constant color, extrapolated data based on the image, extrapolated using artificial intelligence, interpolated from other images, etc.) and/or can otherwise be handled (e.g., by changing the size of the neighborhood for the image or the photoset). The feature module can detect features using Haar features (e.g., Viola-Jones object detection framework), Scale-invariant feature transform (SIFT), Histrogram of oriented gradients (HOG) features, machine learning (e.g., neural networks such as Region proposals, recurrent convolutional neural networks, convolutional neural networks, recurrent neural network, single shot MultiBox Detector (SSD), You Only Look Once (YOLO), Single-Shot Refinemnet Neural Network for object Detection (RefineDet), Retina-Net, Deformable convolutional networks, facial landmarking, etc.), a genetic algorithm, an eigen-face technique, and/or in any manner. For example, a subject's face can be detected using facial landmarking (e.g., geometric techniques, photometric methods, principal component analysis such as using eigenfaces, linear discriminant analysis, elastic bunch graph matching such as using the Fisherface algorithm, the hidden Markov model, the multilinear subspace learning such as using tensor representation, dynamic link matching, etc.), where a facial bounding box, eye positions, and/or a region of interest (e.g., neighborhood) can be determined based on the facial landmarking. As shown for example in FIG. 5, the region of interest can include a subject's face and/or a bust of the subject. However, the region of interest can include any suitable features and/or regions of a subject (including the full subject). However, the feature module can otherwise function.

An alignment module 220 can function to align images of the photoset (e.g., generate an aligned photoset 115), modify images of the photoset (e.g., to change a focus of an image), correct for a variation in camera parameters, and/or can otherwise function. The images are preferably aligned based on the features (e.g., as determined by a feature module), but can be aligned based on a disparity map (e.g., containing disparities between images of the photoset), based on a depth map (e.g., a depth to one or more feature, associated with an image, etc.), based on a calculation (e.g., based on a calibration of the image sensors such as a relative pose, based on an image sensor location, based on an image sensor orientation, etc.), manually, using machine learning (e.g., an artificial intelligence algorithm), and/or can otherwise be aligned. The images are preferably aligned such that the disparity of the feature(s) between images is approximately zero (e.g., disparity is less than a pixel, less than a threshold number of pixels, less than a threshold number of fractional pixels, inverse of a homography matrix transformation has been applied, etc.), but can be aligned such that a depth to the features is approximately the same (e.g., within a threshold depth to the feature in other images, etc.), based on a perceived focus or blur in a lightfield image, and/or can otherwise be aligned. In some examples, the alignment module can crop the images (e.g., based on the feature neighborhood, based on the feature), rotate (e.g., such that two or more features are parallel, such that the feature(s) have the same or parallel orientation, etc.), counter a variation between camera parameters (e.g., variation in camera parameters when multiple cameras are used), and/or perform any suitable transformation(s) to the image(s) (e.g., affine transformations; scaling; transformations as disclosed in U.S. patent application Ser. No. 17/073,927 entitled "SYSTEM AND METHOD FOR LIGHTFIELD CAPTURE" filed 19 Oct. 2020, which is incorporated in its entirety by this reference; etc.). In some variations, the alignment module can apply an offset to images of the image set. The offset can be the same offset, a location dependent offset, an empirically determined offset, an offset that depends on a depth, a camera dependent offset, and/or any suitable offset. The offset can include a translation, a rotation (e.g., about one or more axes such as yaw, pitch, roll, etc.), and/or any suitable offset.

When more than one subject is present, the alignment module can align the photoset to a predetermined subject, to an active subject (e.g., determined based on sensor data), to an intermediate position between the subjects, a passive subject, to a position determined from training data (e.g., based on a number of subjects, based on a perceived lightfield quality rated in the training datasets, etc.), to a predetermined focal position (e.g., selected by a viewer), and/or to any suitable location. For example, an active subject can be identified as a subject that is speaking or making noise (e.g., based on acoustic sensor information, based on voice recognition, based on acoustic triangulation, etc.).

When the focal plane changes between lightfield images (e.g., between frames of a lightfield video), the focal plane can change discontinuously (e.g., jump from a first focal plane to a second focal plane) and/or change smoothly (e.g., transition over a plurality of frames such that the viewer(s) do not notice the focal plane changing, using rack focusing techniques, as a smooth transition disclosed in U.S. patent application Ser. No. 17/326,857 entitled "SYSTEM AND METHOD FOR HOLOGRAPHIC IMAGE DISPLAY" filed 21 May 2021 incorporated in its entirety by this reference, etc.). However, the focal plane can change in any manner. For instance, a near-zero disparity region of a first lightfield image can transition to a near-zero disparity region of a second lightfield image in a stepwise fashion (e.g., incrementally or otherwise increasing a disparity of the near zero disparity region of the first lightfield image, decrementally or otherwise decreasing a disparity of the near zero disparity region of the second lightfield image, etc.).

A communication module 240 can function to transmit data (e.g., images, photosets, sensor data, lightfield image, viewer information, subject information, etc.), particularly but not exclusively, between a display and an image acquisition system. However, the communication module can otherwise function. The communication modules can be wireless modules (e.g., enabling communication over WiFi, cellular, satellite, etc. networks; Bluetooth; optical communication; etc.), wired modules (e.g., coaxial cable, fiber, etc.), and/or other communication modules. For example, the communication (e.g., between receiver and sender) can be transmitted over internet, over a cellular network, over a local area network, and/or over any suitable data network.

The artificial intelligence module 230 can function to process one or more image of a photoset (e.g., to generate additional images or views for the photoset). However, the artificial intelligence can additionally or alternatively function as a feature module, alignment module, a focusing module, and/or in any suitable manner. The artificial intelligence module can ingest one or more images (and/or associated depth), sensor information, and/or any suitable information or data (e.g., an application of the system, a number of subjects, a number of viewers, etc.). The artificial intelligence module can output one or more images (e.g., processed images, generated images, etc., which can include images from different perspectives than the input images such as different vertical perspective, different horizontal perspective, intermediate images, etc.), depth, subject activity (e.g., active subject, subject predicted motion, etc.), and/or any suitable outputs. The artificial intelligence module can include or use machine learning, neural network (e.g., convolutional neural network, recurrent neural network, etc.), Bayesian inference, and/or any suitable algorithms or machine learning methods. The artificial intelligence module can be trained using one or more training data sets. For example, a different training set can be used for different numbers of input images, for different numbers of subjects within the images, for depth images, and/or for any suitable photoset (e.g., where a different algorithm and/or algorithm parameters can be selected or used for the different conditions). However, the artificial intelligence module can be trained using a single training dataset and/or in any manner.

The optional sensors 400 function to determine one or more characteristics of a scene. The sensors can additionally or alternatively function to determine characteristics of and/or changes in the system. The sensors can be collocated with (e.g., be connected to) an image acquisition system and/or display. However, the sensors can be free standing and/or otherwise be arranged. Examples of characteristics of the scene can include separation distance between one or more feature (or subject) in the scene and one or more camera of the image acquisition system, actions associated with a subject (e.g., sound generated from a subject, motion of one or more feature or subject, etc.), location of one or more feature, orientation of one or more subject or feature (e.g., relative to the sensor, display, image acquisition system, etc.), illumination (e.g., how bright is a scene, how is the scene lighted, etc.), and/or any suitable characteristics. Examples of characteristics of the system can include: camera pose (e.g., location, orientation, etc. for image acquisition system and/or each camera in the array), obscuration of one or more cameras, computer speed (e.g., communication speed), memory limits, changes in connection, type of display, number of displays, and/or any suitable system characteristics. Examples of sensors can include: spatial sensors (e.g., ultrasound, optical, radar, etc.), acoustic sensors (e.g., microphones 450, speakers, etc.), light sensors (e.g., photodiodes), tracking sensors (e.g., head trackers, eye trackers, face trackers, etc.), depth sensors (e.g., time of flight sensors, LIDAR, projected light sensors), and/or any suitable sensor.

In some variants, one or more cameras from the image acquisition system can be used as sensors. In a specific example, two cameras from the image acquisition system can be used to collect stereoscopic images of a scene, wherein the stereoscopic images can be used to determine a depth map for the scene. However, the camera(s) can be used as sensors in any suitable manner.

4. Method

The method preferably functions to generate a lightfield image (e.g., still lightfield images, holographic frames of a holographic video, etc.) and/or to modify or set a focal plane of the lightfield image. However, the method can additionally or alternatively set a focal plane of a key frame (e.g., a key frame of a lightfield video), automatically focus a light field image (e.g., select and set a feature to be in the focal plane of a display), dynamically focus a light field image (e.g., select and set a feature to be in the focal plane of a display responsive to inputs or received data), and/or otherwise function. The method and/or steps thereof are preferably performed automatically (e.g., upon receipt of a photoset, upon generation of the photoset, etc.), but can be performed manually (e.g., responsive to inputs from a viewer, user, etc.), semiautomatically (e.g., responsive to a trigger or other input), and/or be otherwise performed. The method and/or steps thereof can be performed in real- or near-real time (e.g., substantially concurrently with image acquisition; concurrently with lightfield image display; within 1 ms, 2 ms, 4 ms, 6 ms, 8 ms, 10 ms, 16 ms, 17 Ms, 20 ms, 32 ms, 33 ms, 40 ms, 42 ms, 48 ms, 64 ms, 82 ms, 83 ms, 100 ms, values therebetween, etc.; etc.), delayed, offline, and/or with any suitable timing.

Receiving a photoset S100 functions to receive a photoset that can be used to generate a lightfield image. The photoset preferably includes a one or more images of a scene (e.g., including one or more subject), where each image shows a different perspective of the scene (or subject). However, the photoset can be otherwise defined. In variants, the photoset can be formatted as a quilt image (as shown for example in FIG. 5), but the photoset can be formatted in any manner (e.g., in any manner as disclosed in U.S. patent application Ser. No. 17/226,404 entitled "SYSTEM AND METHOD FOR GENERATING LIGHT FIELD IMAGES" filed 9 Apr. 2021, which is incorporated in its entirety by this reference). S100 can include acquiring the photoset (e.g., using an image acquisition system), retrieving the photoset (e.g., from a computing system such as from a database, storage, etc.), and/or include any suitable steps. The images of the photoset can be processed (e.g., as described in S400; preprocessed to correct for artifacts, color effects, etc.; etc.) or raw (e.g., unprocessed). The image(s) of the photoset (e.g., for a given frame of a lightfield video) are preferably acquired contemporaneously (e.g., simultaneously, concurrently, within a threshold time, etc.), but can be acquired asynchronously. In some variations, receiving a photoset can include receiving (and/or generating) a render of a scene (e.g., a 3D render) and using one or more virtual cameras to capture images of the render (e.g., to form a photoset). S100 can optionally include generating one or more image (e.g., using artificial intelligence as shown for example in FIG. 9, by interpolating between images of the photoset, etc.) such as to include in (and/or form) the photoset.

S100 can optionally include receiving an audio signal associated with the scene. The audio signal is preferably, but does not have to be, associated with a time stamp (e.g., to enable synchronizing the audio signal with the set of images). The audio signal is preferably received contemporaneously with the images (e.g., images and audio are acquired contemporaneously), but can be received with any suitable timing.

Determining a feature S200 functions to determine one or more feature in each image of the photoset. The feature(s) are preferably present in each image of the photoset. However, the feature(s) can be present in a subset of the images. S200 is preferably performed after S100, but can be performed at the same time as S100. S200 is preferably performed by a computing system, but can be performed by any suitable component. S200 is preferably performed using a feature module, but can be performed using any suitable component or system. The feature(s) are preferably determined automatically, but can be determined manually (e.g., a feature can be selected or identified as a feature of interest where a computing system can maintain the selected feature across frames, a selected region of an image, a selected region on an image sensor, etc.) and/or can otherwise be determined.

The feature is preferably associated with the subject(s) (e.g., a portion of the subject(s) such as a portion of the subject that moves in a constrained manner, a face region of a subject, etc.) in the images, but can be an object within the scene (e.g., a distinctive feature that can be used to track a subject, a tracking feature, etc.), and/or otherwise associated with the scene. When more than one subject is present, the features preferably refer to the same characteristic or aspect of each subject, but can a different feature can be used for each subject. In an illustrative example, particularly, but not exclusively beneficial when the subject is a human or other animal, the feature can refer to the subject's head (e.g., including or excluding the individual's torso, neck, etc.) and/or face region (e.g., eyes, ears, nose, mouth, etc.). In a second illustrative example, the feature can include one or both eyes of the subject(s).

When more than one subject is present, features associated with each subject in a scene are preferably determined. However, features can be determined for a subset of subjects (e.g., a single subject, preferred subjects, etc.) and/or for any suitable subject(s). Preferred subjects can be determined using machine learning (e.g., a neural network trained on data that includes a plurality of subjects, a neural network for a given number of subjects, a neural network trained for a given combination of subjects, etc.), manually (e.g., be selected by a viewer, by a subject, etc.), based on a proximity or distance between the subjects, based on a proximity or distance from a subject to an image capture system, based on an activity (or lack thereof) from of the subject (e.g., talking, moving, entering a field of view, exiting a field of view, etc.), a perspective of the subject (e.g., is a predetermined portion of the subject's face visible in a threshold number of images, a master image, etc.; are both eyes or orbits present in a threshold number of images, master image, etc.; etc.), and/or preferred subjects can be determined in any manner. For instance, when a single subject is engaging in an activity (e.g., speaking such as determined using a microphone, sensor, image recognition, etc.), only features for that subject can be determined. Similarly, when one or more subjects are selected as preferred subjects, only features associated with the preferred subjects can be determined.

The feature(s) can be determined using landmark detection (e.g., including an artificial landmark such as a target object, calibration target, reflective or retroreflective material, etc.), edge detection, corner detection, corner detection, blob detection, ridge detection, a scale-invariant feature transformation, genetic algorithm, eigen-face methods, machine learning, deep learning, neural networks (e.g., convolutional neural networks, deep neural network, non-local neural network, recursive neural network, recurrent neural networks, etc.), artificial intelligence, semantic segmentation, shape detection principle component analysis, and/or be otherwise determined or identified. In some variations, determining the feature can include determining a feature determination method. For example, a first feature determination method can be used to determine (e.g., estimate) a state of the subject(s) (e.g., number, orientation, activity, etc.), where a second feature determination method (e.g., which neural network to use, which algorithm to use, etc.) that determines the features can be determined based on the state of the subject(s).

Determining the feature can include determining landmarks (e.g., key structures of the feature(s)). For example, landmarks can include a nose, one or both eye, eyebrows, lips, chin, cheeks, ears, hairline, teeth, and/or other landmarks of a subject's face or head (e.g., where the face or head can be the feature). However, the landmarks can be the feature and/or be otherwise described.

Determining the feature(s) can include determining a bounding box associated with the feature(s), where the bounding box 215 can function to highlight the feature, used as a crop region for the feature, set a focal plane of the image, reduce a region of the image to process or analyze, and/or can otherwise function. The bounding box preferably surrounds the feature(s), but can additionally or alternatively abut the feature(s) partially surround (e.g., encompass a portion of the feature), be offset from the feature, and/or otherwise be related to or unrelated to the feature. When more than one feature is determined, the bounding box is preferably associated with (e.g., surrounds) all of the features, but can be associated with (e.g., surround) a single feature (e.g., a primary feature, a selected feature, etc.; where the feature can be selected manually, using machine learning, based on a feature property such as continuity between frames, etc.), a duster of features (e.g., features within a threshold distance of each other, features with a threshold change in position between frames, features associated with a common subject, features associated with a common object, features associated with a common subject class, features associated with a common object class, etc.), and/or with any suitable features, objects, and/or regions of the image(s). The bounding box is preferably larger than the feature, but can be the same size as or smaller than the feature. The bounding box can be larger than the feature(s) by a percentage (e.g., 10%, 20%, 50%, 100%, etc. larger than the feature), by a number of pixels (e.g., 5 pixels, 10 pixels, 20 pixels, 50 pixels, 100 pixels, 200 pixels, etc.), to include a predetermined portion or aspect of one or more subjects (e.g., large enough to include a torso of a subject as well as a face region of a subject), and/or can otherwise be larger than the feature. The bounding box can be square (e.g., same number of pixels in a horizontal and vertical direction), rectangular (e.g., different number of pixels in a horizontal and vertical direction), have a shape matching a display, oval, circle, trapezoidal, parallelogram, quadrilateral, polygonal, and/or have any suitable shape. The bounding box can be fixed (e.g., size, shape, etc. can be constant) or variable (e.g., size, shape, etc. can vary). The bounding box can be a fixed size (e.g., a predetermined number of pixels, associated with a predetermined real size, relative to a camera sensor, etc.) and/or have a variable size (e.g., change between frames, change as a feature size changes, change as a feature moves relative to the focal plane, etc.). As shown for example in FIG. 5, a feature can include one or both eyes of a subject, a feature box can surround a face region of a subject, and a bounding box can surround the feature (e.g., include a face region and a torso of a subject). However, any suitable bounding box can be used.

When more than one subject is present, a single bounding box can be used that includes each subject, a bounding box for each subject can be used, a bounding box for subsets of subjects can be used, and/or any suitable bounding boxes can be used.

Figure 10:
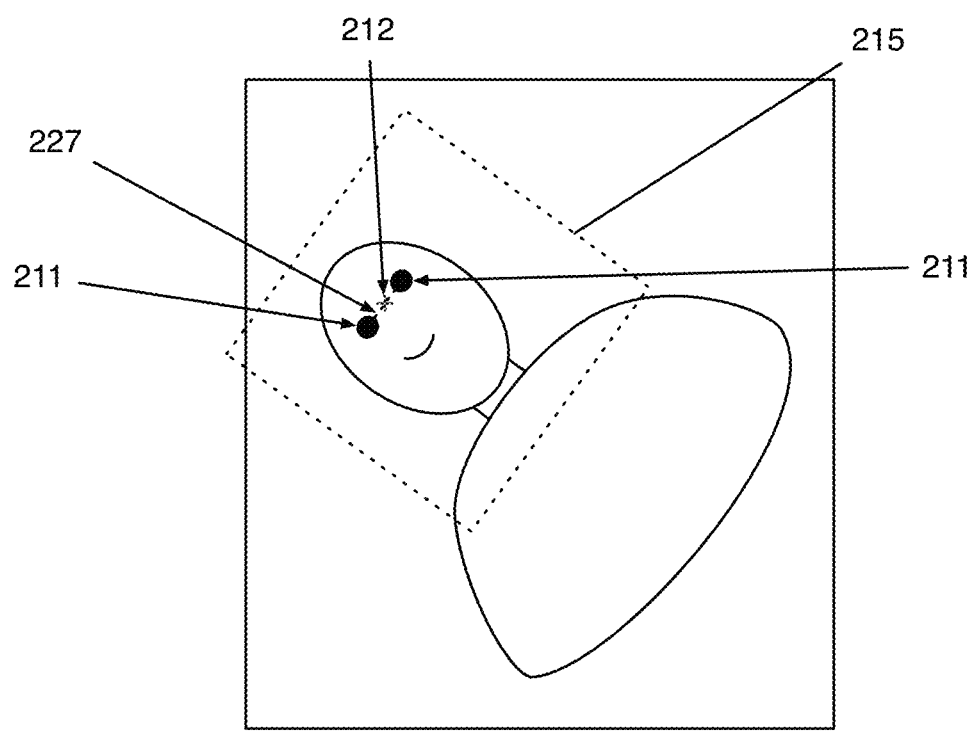
FIG. 10 is a schematic representation of an example of aligning a bounding box and features.

S200 can include combining two or more features. Combining two or more features can function to select a point or feature to set at the focal plane of a display (e.g., when the images are displayed as a lightfield image). Two or more features can be combined by taking an average, weighted average, interpolating between the features, extrapolating from the features, using a feature model (e.g., a generic model of a face or head region), using artificial intelligence (e.g., a neural network), and/or in any suitable manner. As an illustrative example, as shown in FIG. 10, each eye of a subject can be a feature and the two features can be combined to determine a feature point (e.g., focal point) in the middle of the eyes. However, features can otherwise be combined.

When more than one feature is determined, S200 can optionally include selecting one or more features from the features, where the selected feature(s) can be used for image processing (e.g., in S400). The feature(s) can be selected based on a feature classification (e.g., determined using semantic segmentation, image classification, etc.), a relationship between the feature and other features (e.g., separation distance, relative feature characteristics between images, feature clustering such as an expectation for two eyes to be identified in a shared face, etc.), a user selection (e.g., a viewer selected feature, a viewer selected region, a viewer selected subject, a subject selected feature, etc.), sensor data (e.g., threshold subject activity where the subject is associated with the feature), a voting process (e.g., between feature selection or determination methods), according to a preferred selection method (e.g., a hierarchy of feature determination methods, first determination method to identify features, etc.), and/or in any manner.

Determining a depth map S300 functions to determine a distance (e.g., depth) to one or more points in one or more images of the photoset. A depth map can be determined for each image of the photoset, for a subset of images of the photoset, for a single image of the photoset (e.g., a master image, a central image, etc.), and/or for any suitable images. A depth map can be generated for an entire image, for a subset of an image (e.g., a subset of an image associated with a feature as determined in S200, a region surrounding a feature such as a bounding box around a feature, etc.), and/or for any suitable region or portions of image(s).

S300 can additionally or alternatively function to augment the information content of each image of the photoset and/or otherwise function. For example, S300 can change images of the photoset from an RGB (or other color format) to RGB-D data. S300 is preferably performed after S100, but can be performed at the same time as S100 (for example, when image acquisition includes depth acquisition, using a depth camera, etc.). S300 is preferably performed by a computing system (e.g., a depth module of a computing system), but can be performed by any suitable component.

The depth map can be determined using sensor data (e.g., distance sensor, depth sensor, depth camera, LIDAR, SONAR, etc.), based on an image segmentation (e.g., foreground, background, middle-ground, etc.), 3D scanning, using machine learning (e.g., using a neural network trained to estimate a depth in an image), based on a stereo image pair (e.g., determining disparities between a pair of images of the photoset and determining a depth based on a distance between the cameras used to acquire the pair of images), based on a set of images of the photoset (e.g., multiple images to facilitate better accuracy, such as using stereo-image techniques pairwise between images of the set of images), using object constraints (e.g., using semantic segmentation, object detection, etc. to identify objects and using constraints, averages, typical, etc. values to infer, calculate, etc. a depth), and/or otherwise be determined.

Processing the photoset S400 functions to process images of the photoset, to generate views associated with a lightfield image, set a focal plane for the lightfield image, and/or otherwise functions. S400 is preferably performed after S200, but can be performed at the same time and/or before S200. S400 is preferably performed after S300, but can be performed at the same time and/or before S300. S400 is preferably performed by a computing system (e.g., a processing system of a computing system), but can be otherwise performed. Every image of the photoset is preferably processed; however, one or more images can remain unprocessed. Each image of the photoset is preferably processed in the same manner. However, one or more images can be processed in different manners.

S400 and/or steps thereof are preferably performed without generating a render (e.g., a virtual representation of the scene) and/or without determining a depth (e.g., a depth can be measured but is preferably not calculated or derived). This can be beneficial for enabling real-time focusing of the lightfield image (e.g., during image capture). However, some embodiments of S400 may benefit from and/or use or generate a render or depth information which can be beneficial for adjusting aspects of the lightfield image (e.g., when the lightfield image is stored, when the lightfield image is preprocessed, when a computing system has sufficient resources, etc.).

Figure 4:
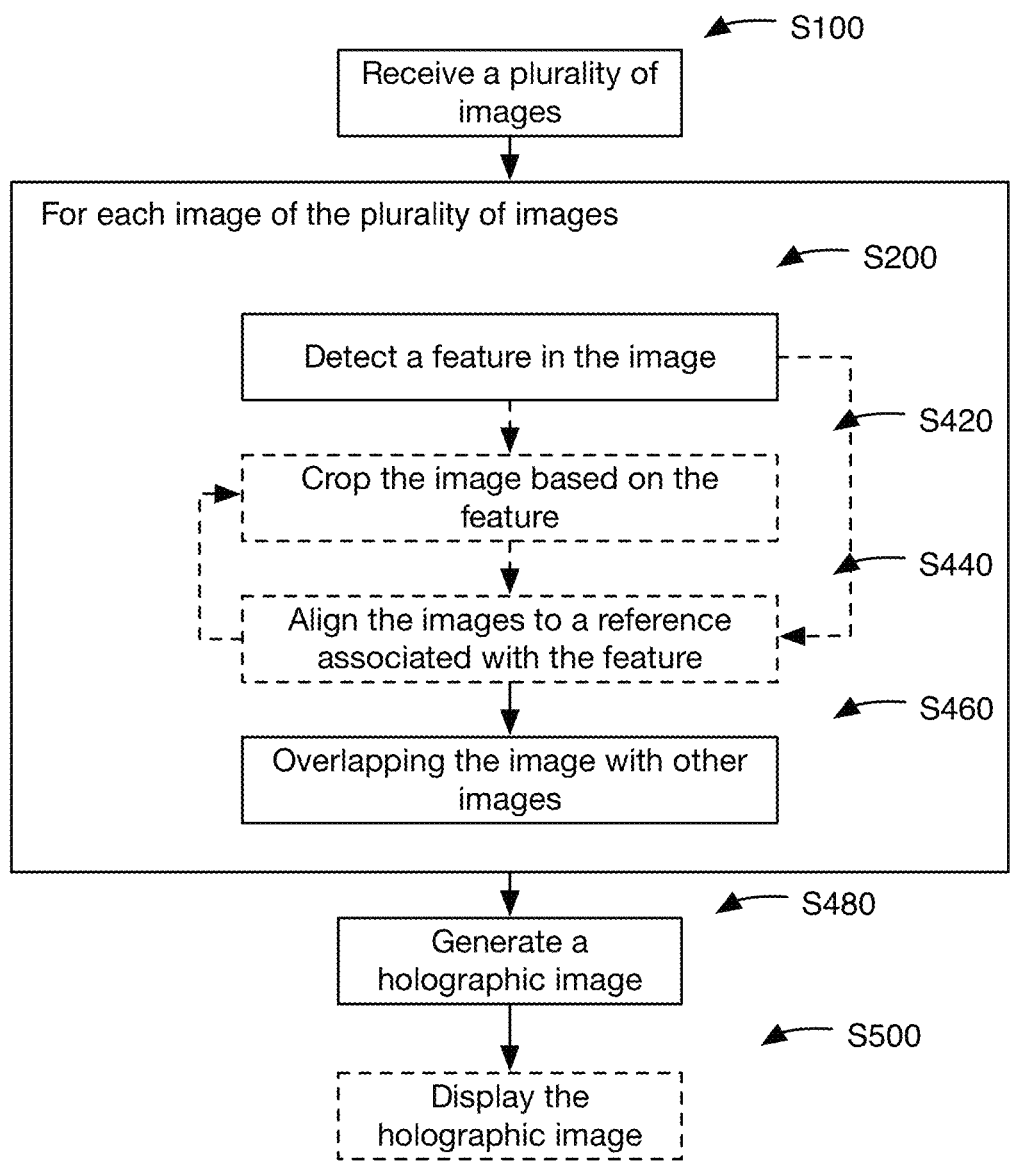
FIG. 4 is a schematic representation of an example of the method.

Each image is preferably processed based on the features, feature points (e.g., focal points, combined feature 212, etc.) and/or landmarks (e.g., as determined in S200) in said image. However, additionally or alternatively, the images can be processed based on the image acquisition system (e.g., an image acquisition system calibration, arrangement, separation between cameras, etc.), feature(s) and/or landmark(s) in other images (e.g., an image can be used as a master or primary image where other images are processed based on the master or primary image), the image depth, the image color, display properties (e.g., display calibration), image properties, and/or be processed based on any suitable information. As shown for example in FIG. 4, processing the images can include: cropping images (e.g., according to a crop box or bounding box), aligning images (e.g., positioning a feature of the images to the same position within the crop box), generating views associated with a lightfield image, and/or determining a zero-disparity location. However, processing the images can additionally or alternatively include rectifying images (e.g., ensure that epipolar lines for images are parallel), transforming images (e.g., applying affine transformation, a projective transformation, Euclidean transformation, warping images, etc.), correcting images (e.g., balancing brightness, modifying brightness, balancing contrast, modifying contrast, modifying color, etc.), refocusing images, and/or any suitable processing steps. In a specific example, the images can be rectified using a calibration of the image acquisition system. For instance, an array of cameras can be mounted on a rack (e.g., linear rack, rigid rack, semi-rigid rack, etc.) with a known spacing (e.g., equal spacing, unequal spacing, etc.), where the calibration can be determined using target images (e.g., to measure individual camera differences). In this specific example, the images can be rectified by applying a linear transformation (e.g., horizontal-only transformation, vertical-only transformation, horizontal and vertical transformation, etc.) to the cropped area to align key landmark(s) (e.g., features). In this specific example, having a consistent (e.g., approximately equal such as within 1 mm, 2 mm, 5 mm, 1 cm, 2 cm, 5 cm, 10 cm, 20 cm, 50 cm, etc.) separation between cameras, can be beneficial as the transformation needed from one image to another can also be consistent, which can result in a low computation load. However, this specific example can otherwise enable any suitable benefit. In some examples, the calibration step can be omitted or otherwise not be performed (e.g., when a subject is stationary, when a camera is moving, etc.). However, the images can otherwise be processed.

Cropping an image S420 functions to reduce an image size, highlight the subject (or feature) within the image, and/or otherwise functions. Each image is preferably cropped to the same size; however, one or more images can be cropped to a different size. The crop region (e.g., bounding box) can be set based on a feature and/or landmark (as determined in S200), a predetermined region of the image (e.g., when the images have been aligned before cropping the image), based on the image acquisition system (e.g., extrinsic parameters, calibration, etc.), based on a bounding box of a master image (e.g., based on a bounding box in a master image and a relationship between the camera that acquired the master image and the camera that acquired the image), and/or otherwise be set. The crop region is preferably centered on the feature and/or landmark. However, the crop region can be offset from (e.g., by a predetermined amount, based on the image acquisition system, etc.), overlap, intersect, and/or be otherwise arranged relative to the feature and/or landmark. When more than one feature is present, the crop region preferably includes every feature, but can include any suitable subset of the features and/or landmarks (e.g., based on what features are in the other images) and/or include any portion of the image.

The crop region is preferably larger than the feature, but can be the same size as and/or smaller than the feature. The crop region can be a fixed size (e.g., a predetermined number of pixels, a predetermined area, a predetermined fraction of the total image, a predetermined aspect ratio, etc.) or a variable size (e.g., based on a feature size, based on an image size, based on a display size, based on a display resolution, etc.). In an illustrative example, the crop region can be a fixed percentage of the feature (such as 100%, 150%, 200%, 300%, 400%, 500%, 1000%, etc.). For instance, if the feature occupied a 200×200 pixel region of the image, the crop region could be a 300×300 pixel region, where a center of the crop region can be the same as the center of the pixel region. However, the crop region can have any size and orientation relative to the feature.

In some variants, the crop region can be transformed (e.g., rotated, translated, etc.) such as to align the crop region to a reference of the image (e.g., as described in S440, to be parallel to the reference, to be perpendicular to the reference, etc.). However, the image can be aligned or transformed (e.g., before cropping the image).

Aligning the image S440, functions to transform (e.g., rotate, translate, scale, warp, etc.) one or more image (e.g., unprocessed image, cropped image, crop region, etc.). S440 can be performed before, during, and/or after S420. In some examples, a crop region position can be set so that after cropping the image, the cropped images are aligned. The images are preferably aligned to a reference of the image (e.g., a reference line, reference point, reference surface, alignment guide 227, etc.), but can be aligned to an edge of the image, an image corner, and/or otherwise be aligned.

The reference is preferably associated with (e.g., the same as, defined by, etc.) the feature and/or landmark, but can be a reference object within the image, and/or be associated with any portion of the scene and/or subject. In an illustrative example, the reference can be a reference line that intersects the eyes of a subject. In a second illustrative example, the reference can be a fit that intersects a plurality of features. However, the reference be any suitable landmark, intersection of landmarks, feature, feature region, combined feature, and/or any suitable reference.

An image can include more than one reference. For example, an image that includes two subjects can include two (or more) references (such as the eye positions of the subjects, a line that connects the eye region of each user, a line that connects an eye of one subject to an eye of another subject, etc.). When more than one reference is present, the images can be aligned such that each reference of an image is aligned to the respective reference in another image, such that each reference is aligned within a threshold alignment of a reference of another image, such that a single reference is aligned between images (e.g., a reference associated with a preferred subject is aligned whereas a reference associated with another subject is not necessarily aligned), and/or the reference(s) can otherwise be aligned. The reference(s) are preferably aligned using a linear transformation, but can be aligned using a nonlinear transformation.

Aligning the images can include rotating the images. The images are preferably rotated so that a reference line of each image is parallel. However, the images can be rotated so that the reference lines are perpendicular, so that the reference surface and/or reference points have a predetermined orientation, and/or so that the images have any orientation.

Aligning the images can include translating the images. The images are preferably translated so that the reference is in a common horizontal plane. For example, a top, middle (mean), bottom, and/or any portion of the references can be aligned to the same horizontal plane. However, the image(s) can be otherwise translated.

Aligning the images can include scaling the images. The images are preferably scaled so that the reference has the same size within each image. However, the images can be otherwise scaled.

Aligning the images can additionally or alternatively include setting (e.g., aligning, rotating, arranging, translating, scaling, etc.) the bounding box relative to the feature. For instance, an edge of the bounding box can be set parallel (or perpendicular) to the reference (as shown for example in FIG. 10).

However, aligning the images can include transforming the images (or bounding boxes) in any manner.

Overlapping the images S46o functions to overlap feature(s) of each image. Overlapping features can refer to setting a disparity of the feature(s) to near zero (e.g., using a transformation, where near zero can be exactly 0 disparity, a disparity that is at most a threshold disparity such as a subpixel disparity, less than 2 pixels, less than 5 pixels, less than 10 pixels, etc.; a horizontal disparity that is at most a threshold disparity such as a subpixel disparity, less than 2 pixels, less than 5 pixels, less than 10 pixels, etc.; a vertical disparity that is at most a threshold disparity such as a subpixel disparity, less than 2 pixels, less than 5 pixels, less than 10 pixels, etc.; etc.), images that have been overlapped using an inverse homography matrix transformation (e.g., based on features of the images), features that have the approximately the same depth (e.g., depth is the same to within a threshold depth such as 1 µm, 10 µm, 100 µm, 1 mm, 5 mm, 10 mm, values therebetween, etc.), and/or can features can otherwise be referred to as overlapped features.

When one or more features have been overlapped between the images of the photoset, the overlapped features preferably appear at the focal plane (e.g., of the display (e.g., when the lightfield image is displayed). However, the features can otherwise appear when the features are overlapped. The features to overlap are preferably automatically selected, but can be selected by a viewer, a subject, and/or can otherwise be selected. The features to overlap (e.g., the zero-disparity location) can depend on a subject (e.g., subject activity such as to focus on an active subject; a duration since a subject was in focus; etc.), a viewer (e.g., a viewer preference, a viewer gaze such as to focus on a portion or feature of the image that the viewer is looking at as determined using a gaze tracker, etc.), the image acquisition system, and/or any characteristic of the image(s) or the scene. The feature(s) to overlap (e.g., the zero-disparity location) is preferably the same between different images of the photoset (e.g., the same feature, feature portion, combined feature, etc. is overlapped in or used to overlap each image). However, different sets of images can be overlapped differently. The zero-disparity location 225 can be a point, line, surface, region, segment, and/or any suitable portion of the image. In an illustrative example, the zero-disparity location can be midpoint between a subject's eye (e.g., a combined feature). However, the zero-disparity location can be a subject's eye (left eye, right eye), nasal tip, unique facial feature, hairline, glasses, lips, chin, and/or any suitable feature, object, or other aspect of the image can be used.

In some variants, overlapping images can include adjusting an image (e.g., refocusing an image) such that a feature depth for a feature in two or more images is substantially the same (e.g., less than a threshold amount). The depth can be determined from a depth sensor (e.g., depth camera, depth buffer, depth information, LIDAR, SONAR, RADAR, etc.), a depth map (e.g., generated using stereoimages), visual cues, machine learning, and/or in any manner.

Generating a lightfield image S480 functions to combine the images (e.g., unprocessed images, cropped images, aligned images, adjusted images, processed images, etc.) to form a lightfield image. S480 can additionally or alternatively function to determine a set of views based on the images. S480 can include generating views, aggregating the views, and/or any suitable steps.

Figure 3:
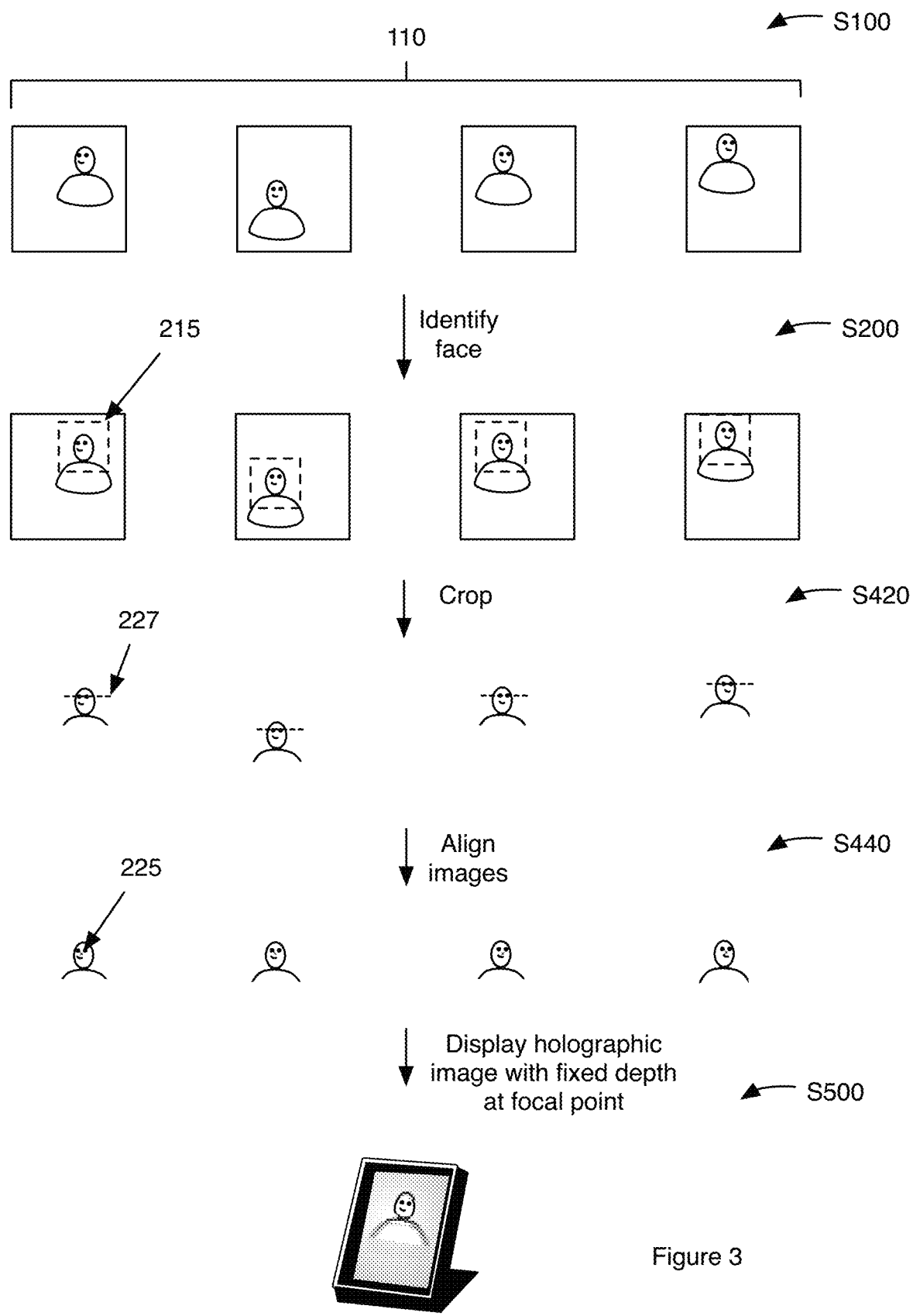
FIG. 3 is a schematic representation of an example of the method.

Generating the views functions to generate a plurality of views, where each view will be transmitted in a different direction by the display to create the perceived 3D image. The views are preferably generated so that the overlapped feature (e.g., zero-disparity location) is in the focal plane of the display (e.g., as shown in FIG. 3), but can be otherwise generated. The views can be generated using one or more virtual cameras to capture views (e.g., of a 3D virtual environment associated with the scene and/or subject), calculated from one or more image of the photoset, and/or otherwise be generated. In a first illustrative example the views can be generated by rendering the photoset (e.g., the cropped images, the aligned images, the unprocessed images) with depth information (e.g., the RGBD images) in a 3D virtual environment (e.g., using a lightfield renderer), arranging the zero-disparity location to a focal plane of the render (e.g., by setting a virtual camera distance from the render based on the zero-disparity location), and capturing the views (e.g., by using the virtual cameras to capture the views). In a second illustrative example, the views can be determined by calculating a disparity for each pixel of a view based on how far the pixels depth extends from the zero-disparity location (e.g., the focal plane). In a third illustrative example, the views can be generated by cropping the images of the photoset, where the cropped images are preferably overlapped (e.g., bounding box is set such that the cropped images are overlapped). However, the views can be otherwise generated.

Aggregating the views preferably functions to arrange the views in an order that can be read or processed by the display. For example, the views can be aggregated in a quilt image and/or otherwise be arranged (e.g., in a format as disclosed in U.S. patent application Ser. No. 17/226,404 entitled "SYSTEM AND METHOD FOR GENERATING LIGHT FIELD IMAGES" filed 9 Apr. 2021, which is incorporated in its entirety by this reference). The aggregated views can be aligned to a display (e.g., each view can be aligned to pixels or subpixels of the display based on the display calibration to generate a lenticularlized image), be stored as an aggregate of views (e.g., as a quilt image), and/or be otherwise processed to form a hologram.

S400 can optionally include adjusting the lightfield image (and/or views or associated photoset) which functions to adjust a visual appearance of the lightfield image. The images are preferably adjusted based on a viewer and/or subject input, but can be adjust automatically (e.g., using a machine learning module to determine a preferred image setting). In an illustrative example, the images of the photoset (or lightfield image) can be adjusted by a viewer using a custom 3D cursor that can select points in 3D space. However, the image can be adjusted using a 2D cursor, a counter, slider, based on a biophysical response (e.g., gaze tracking, eye tracking, eye vector tracking, EEG sensing, gesture, etc.), and/or any suitable user interface. Adjusting the images can include setting a zero-parallax point, zooming, panning, setting a parallax scale, and/or any suitable adjustment(s).

Setting a zero-parallax point can include selecting a zero-parallax location, where the lightfield image can be updated with the new zero-parallax location. In an illustrative example, a viewer can double click a 3D cursor at a point, where the depth at that point can be set to the zero-disparity point (e.g., by translating a virtual camera forward or backward to align the virtual camera plane with the selected point). In a second illustrative example, the zero-parallax plane can be set as a parameter. However, the viewer can otherwise select the zero-parallax location.

Zooming in or out of the lightfield image can function to adjust a scale of the lightfield image. The image is preferably scaled based on a viewer input (e.g., a scroll wheel motion such as zoom in by scrolling up and zoom out by scrolling down or vice versa), but can be otherwise scaled. The image is preferably scaled proportionally in all axes (e.g., isotropically), but the image(s) can be scaled anisotropically (e.g., along one axis, by a different amount in one axis than another axis, etc.), and/or along any suitable reference frame. The image is preferably scaled about a center point (e.g., a viewer selected center, an image center, etc.), but can be about a feature point, a zero-disparity location, and/or any suitable location.

Panning the image preferably functions to translate the image (e.g., lightfield image, RGBD data, etc.) along an x and/or y axis (e.g., without changing a depth, z dimension, etc.) but can translate the image along any suitable axis. The image is preferably translated by a viewer input (e.g., dragging an image), but can be otherwise translated. Translating the image preferably does not affect or change the zero-disparity location, but can change the zero-disparity location.

Figure 11A:
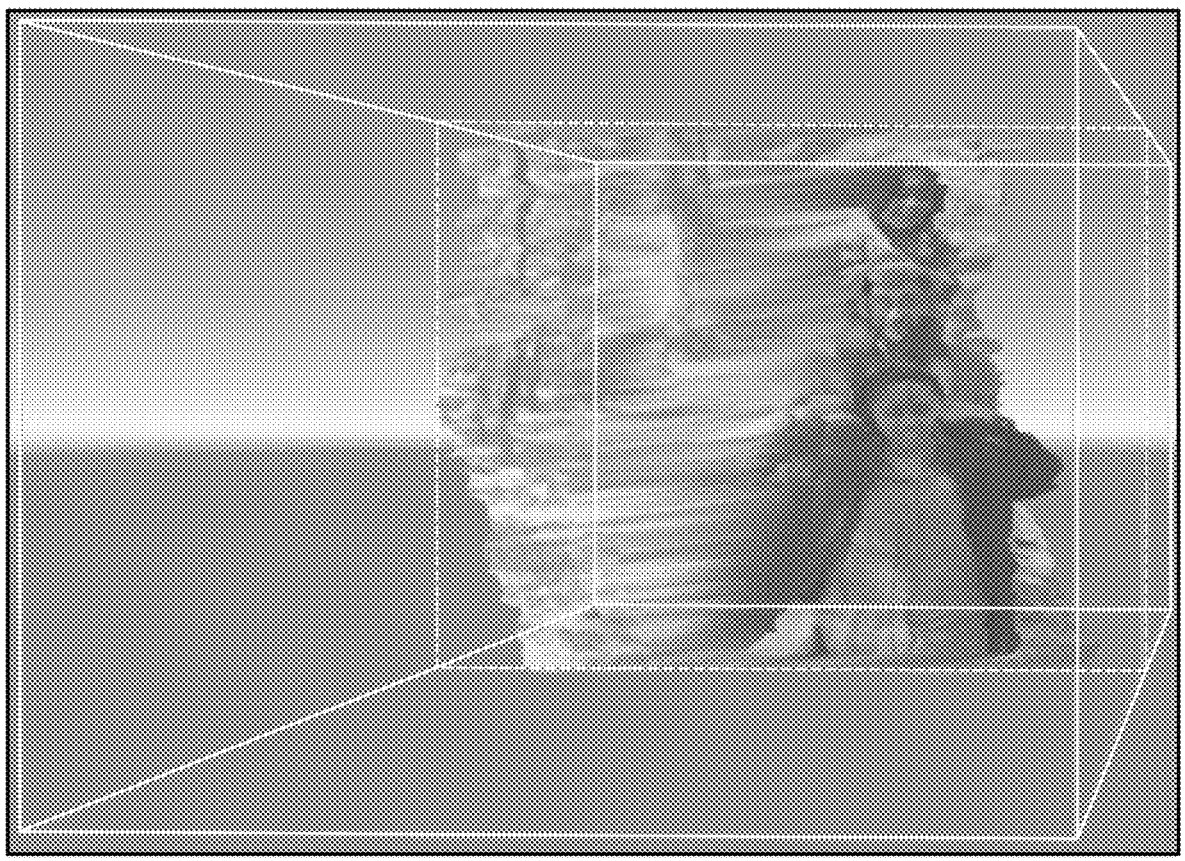
FIGS. 11A and 11B are exemplary views of a lightfield image with high parallax and low parallax, respectively.
Figure 11B:
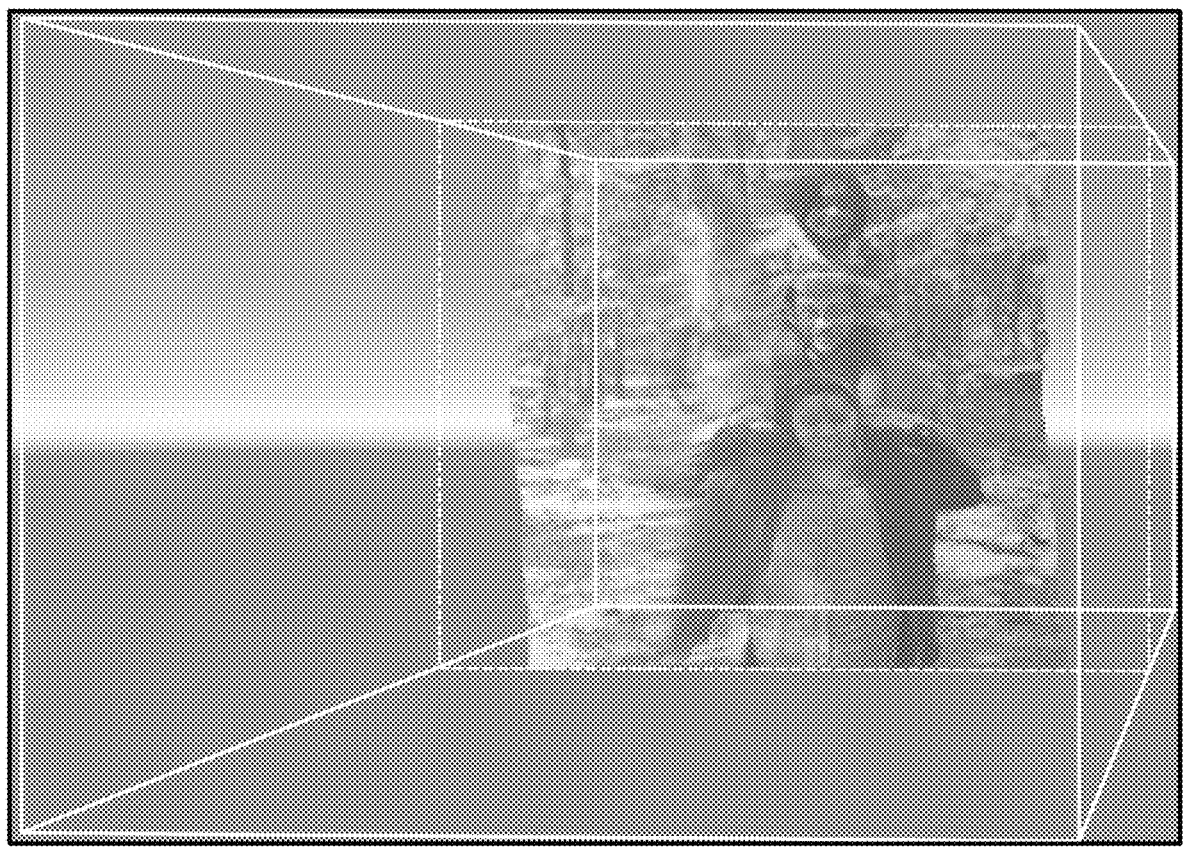

Setting a parallax scale functions to modify a perceived parallax within the lightfield image (as shown for example in FIGS. 11A and 11B showing the effect of a high parallax or low parallax scale). The parallax scale can be modified discretely or continuously. When or as the parallax scale is modified, the zero-disparity location (e.g., selected features) preferably remains in the focal plane of the display, but can be moved away from the focal plane. In a first example, the parallax scale can be modified by holding a zoom modification key and scrolling with a scroll wheel. In a second example, the parallax scale can be modified using parallax scale buttons. However, the parallax scale can be otherwise set.

Displaying a lightfield image S500 functions to display a lightfield image to one or more viewers. S500 preferably displays the lightfield image as generated in S400 (e.g., including processed views), but can display any suitable images (e.g., raw images, images as received in S100, etc.). The lightfield image is preferably viewable (e.g., perceivable as 3D) without using peripherals (e.g., headsets, glasses, etc.). However, the lightfield image can be viewable (e.g., perceived as 3D when using) using peripherals. S500 preferably occurs after S400, but can occur before and/or at the same time as S400. S500 is preferably performed by a display, but can be performed by a computing system and/or any suitable system. S500 can include storing the lightfield image, generating a lenticularized image (e.g., where the lenticularized image is displayed by display as the hologram such as by aligning the lightfield image to the display based on a calibration of the display that can include a pixel pitch, parallax barrier pitch, parallax barrier angle, etc.), and/or any suitable steps. When the lightfield images are associated with a lightfield video (e.g., are frames of a lightfield video), the lightfield images are preferably presented sequentially at a rate that is substantially equal to the image acquisition system frame rate (e.g., images that are acquired in S100 are displayed in S50o before another instance of S100 occurs), but can be presented at any rate (e.g., faster than the image acquisition system frame rate, slower than the image acquisition system frame rate, etc.). S500 can include presenting an audio signal (e.g., synchronous audio data created by the subjects).

5. Illustrative Examples

In a first illustrative example, a method can include receiving (e.g., acquiring) a set of images of a scene from different perspectives; determining a feature in each image; aligning the feature in the images such that the features have near-zero disparity among the images; and optionally displaying the aligned images as a holographic image. In the first illustrative example, the features are preferably aligned without knowing a depth associated with the features and/or without generating a render of the scene and/or subjects. However, the features can be aligned (e.g., alignment refined) by determining a depth and/or render.

Figure 6A:
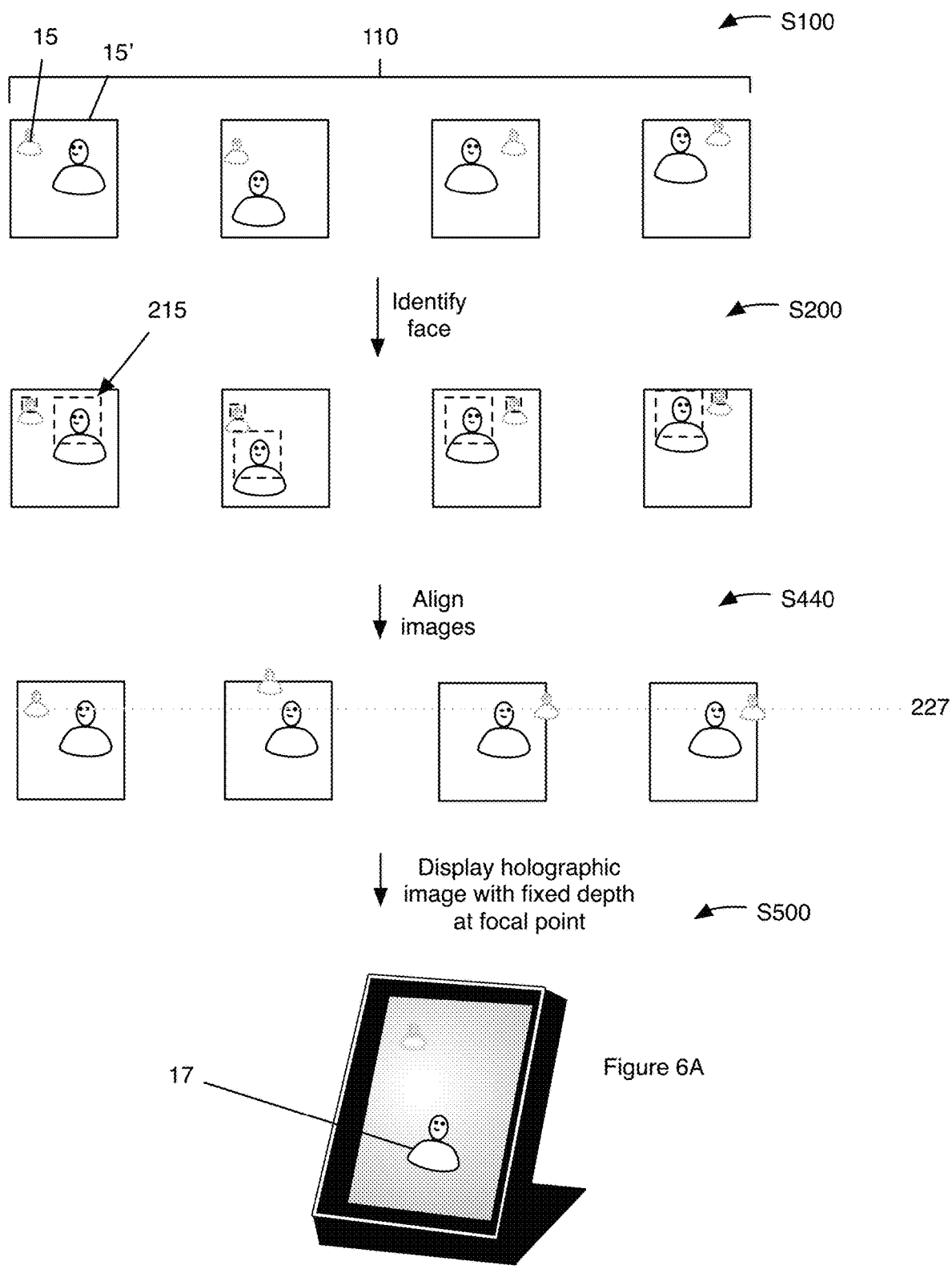
FIGS. 6A-6C are schematic representations of examples of adjusting a focus of a lightfield image with more than 1 subject.
Figure 6B:
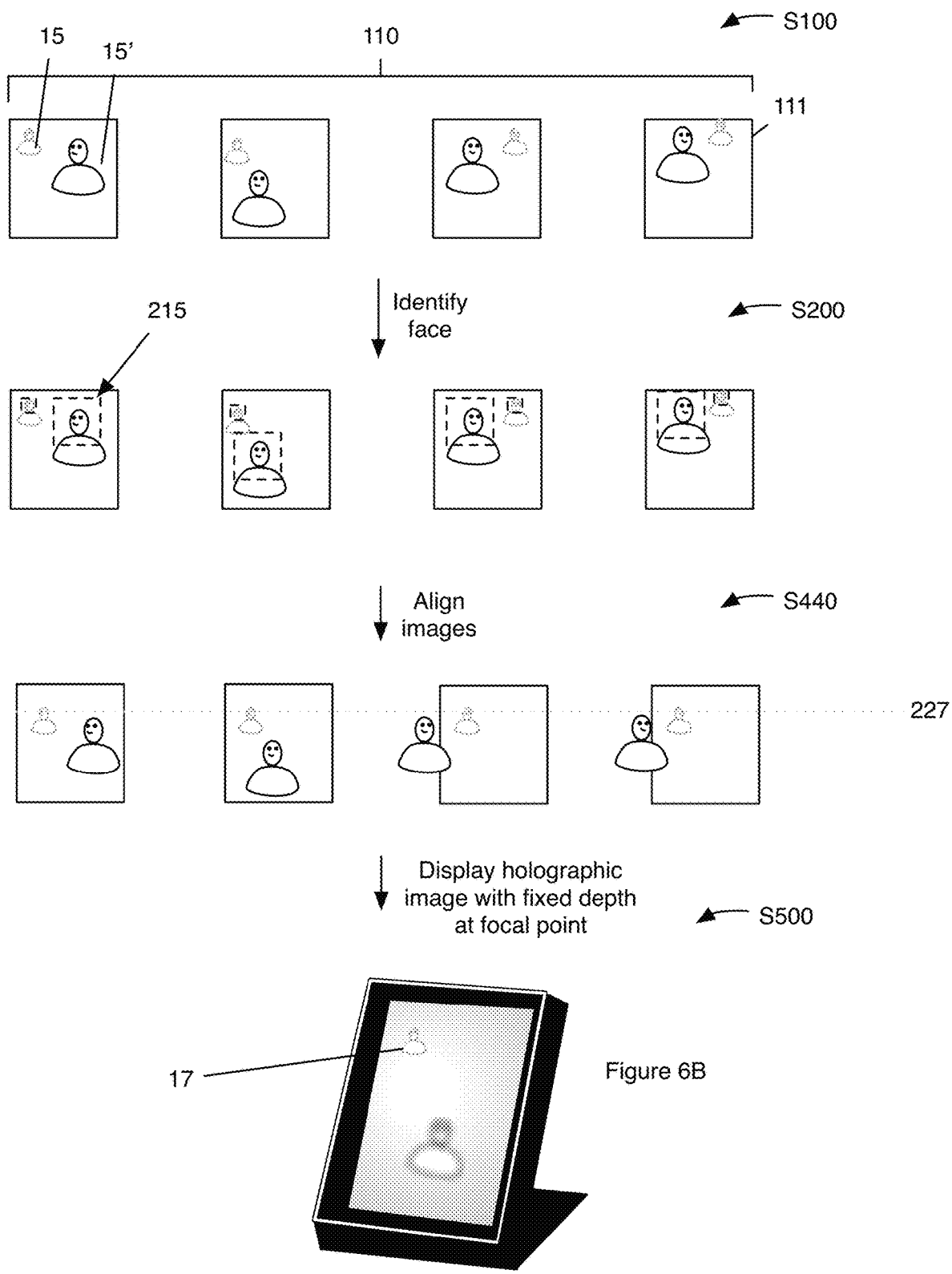
Figure 6C:
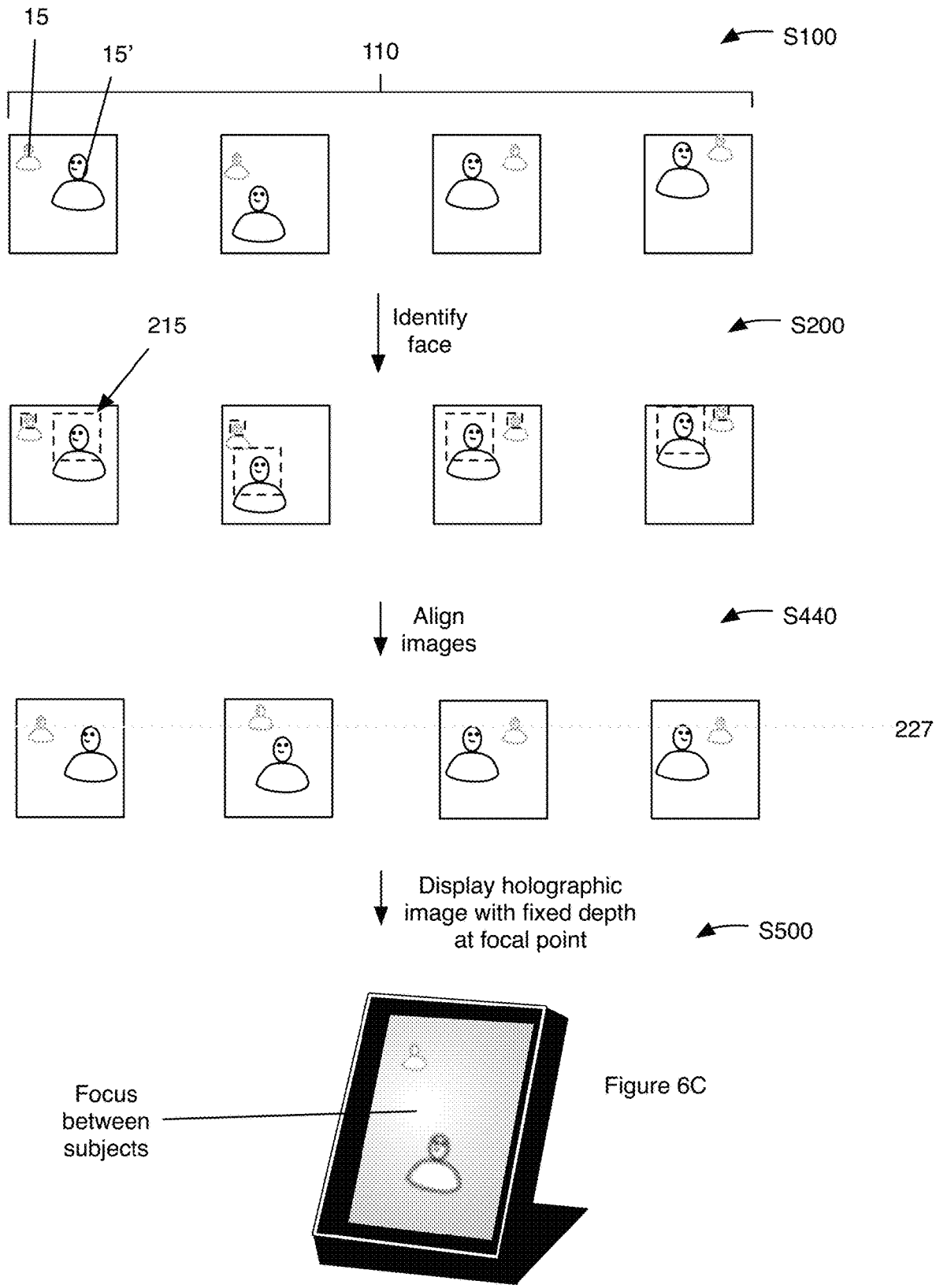
Figure 6D:
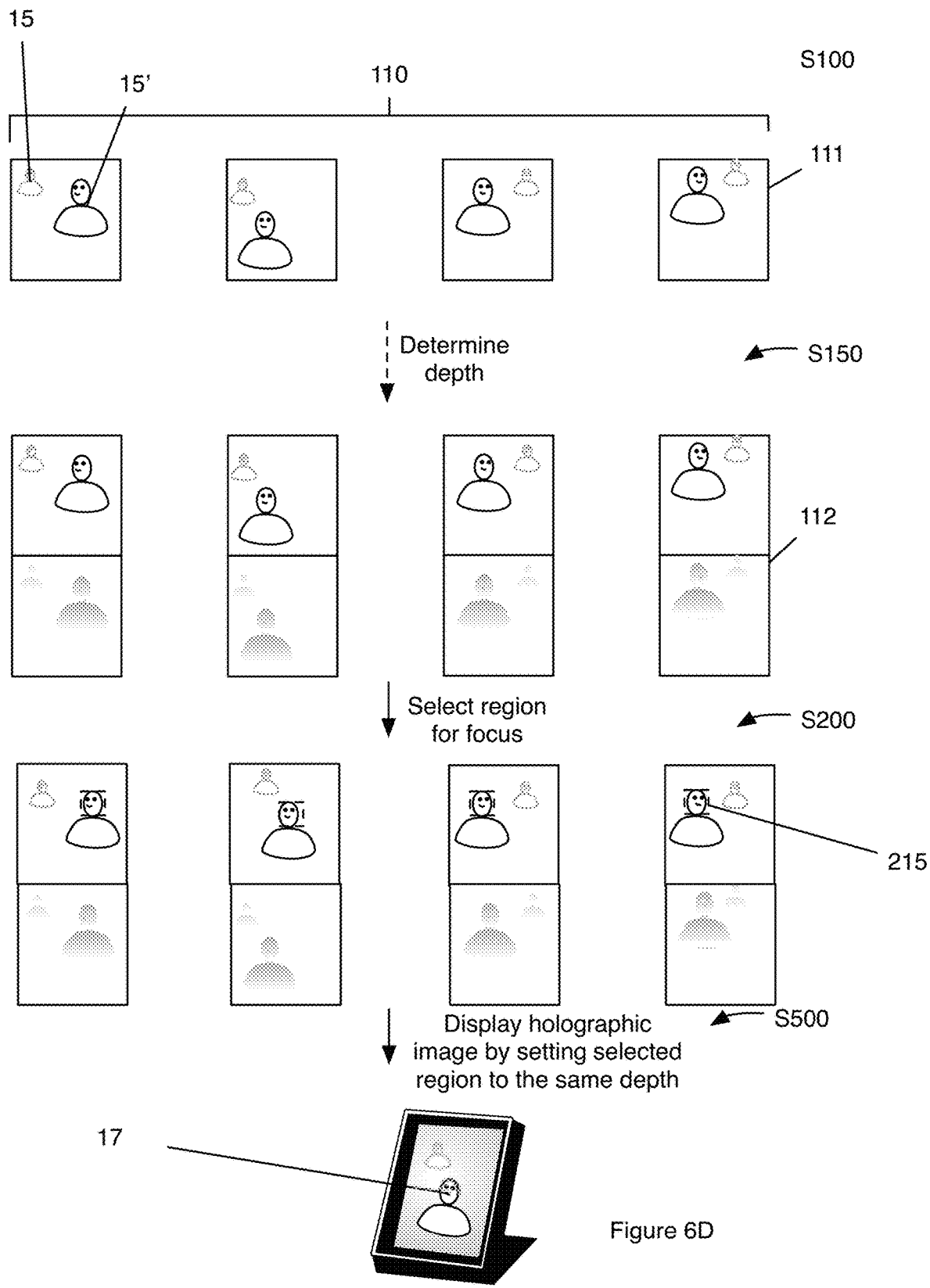
FIG. 6D is a schematic representation of an example of adjusting a focus of a lightfield image based on a depth.

In a variation of the first illustrative example, such as when the scene includes a plurality of subjects 15, 15', the method can include determining at least one feature associated with each subject, and setting at least one of the features to a near-zero disparity. For instance (as shown for example in FIGS. 6A and 6B), a feature associated with a subject can be set to near-zero disparity (which can result in other subjects appearing off of the focal plane). However, a feature intermediate between features of the subjects can be set to near-zero disparity (e.g., as shown for example in FIG. 6C which can result in each subject being close to, but necessarily in, the focal plane), each feature (e.g., each feature associated with a subject) can be set to a near-zero disparity (e.g., which can result in each subject being in or near the focal plane but may result in a loss of depth or perceiving the relative position of the subjects), and/or the features can be overlapped in any manner. In a second variation of the first illustrative example, such as when depth information is available for each image, aligning the features can additionally or alternatively include setting a depth of one or more feature to the display focal plane (e.g., to 0 or near 0 depth).

Figure 9:
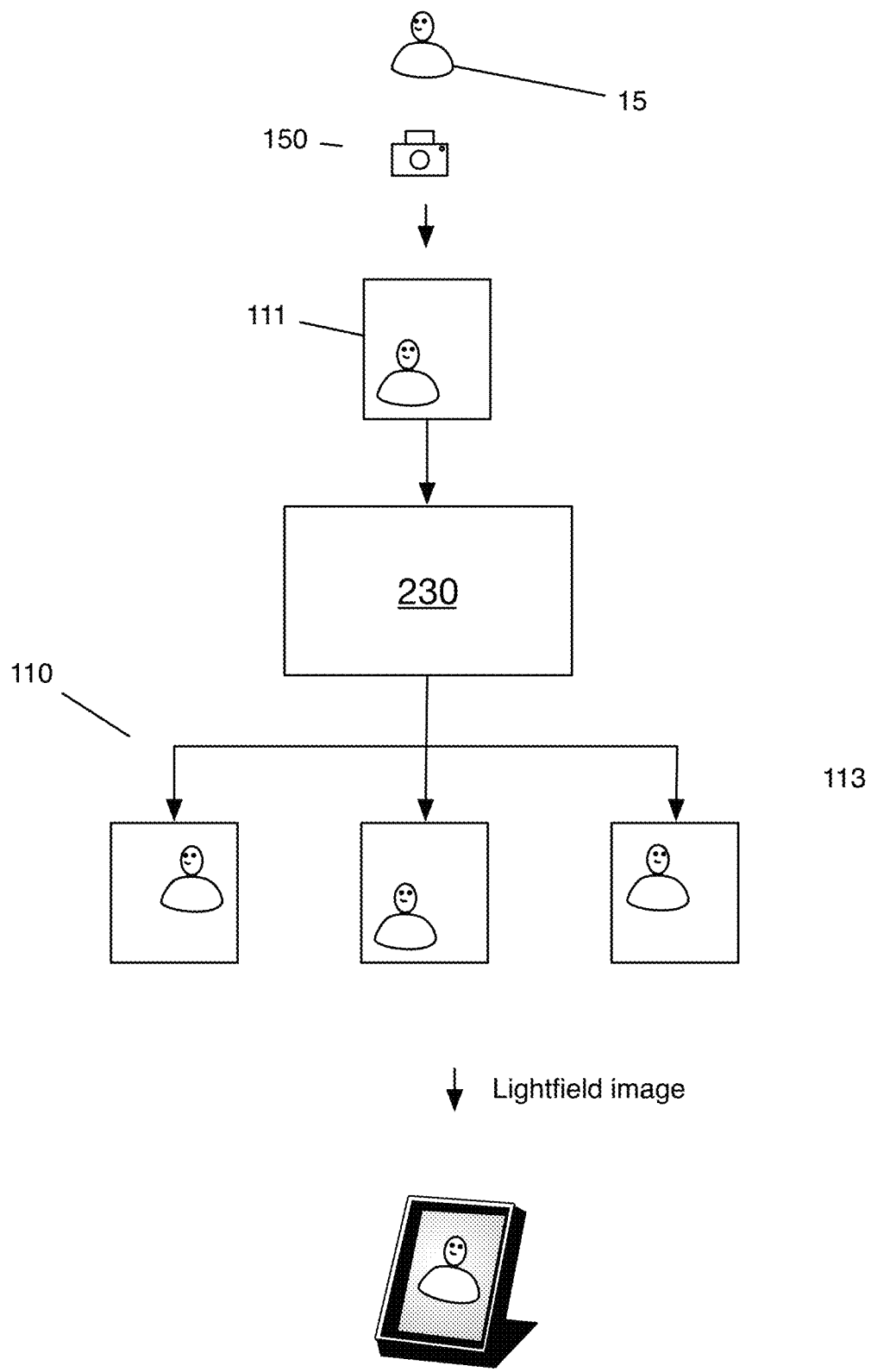
FIG. 9 is a schematic representation of an example of using artificial intelligence to generate one or more images for a photoset.

In another variation of the first illustrative example, as shown for instance in FIG. 9, the set of images can include a real image (e.g., acquired using a camera, webcam, etc.) and the method can include generating synthetic images (of the scene from different perspectives) from the real image (e.g., using machine learning) where the displayed lightfield image can include the real image and the synthetic images. The synthetic images can be generated at the same focal plane as the real image (e.g., a feature of the real image and a corresponding feature of the synthetic image can be overlapped), features in the synthetic images can be aligned (e.g., between synthetic image, to the real image, etc.), and/or the synthetic images can otherwise be aligned.

In a second illustrative example, a method can include: receiving a set of images of a scene from different perspectives; determining a gaze or eye vector of one or more viewers of a display; determining a feature in each image of the set of images based on the gaze or eye vector of the viewer(s); aligning or overlapping the features in each image; and optionally displaying the set of aligned images. Aligning (or overlapping) the feature(s) can include transforming (e.g., translating, rotating, scaling, warping, etc.) one or more images such that a feature disparity between images is near zero, adjusting a feature depth to a shared depth (e.g., a depth of 0 indicating that it is on the focal plane, a common depth such that the features are on the same focal plane which may be the same as or different from a focal plane of a display, etc.), aligning a bounding box (e.g., based on a camera pose between the cameras which captured the images, to a predetermined orientation based on the feature(s), etc.) and cropping the images to the bounding box, using an inverse homography matrix transformation, and/or in any manner. In the second illustrative example, the features are preferably aligned without knowing a depth associated with the features and/or without generating a render of the scene and/or subjects. However, the features can be aligned (e.g., alignment refined) by determining a depth and/or render.

In a third illustrative example, a method can include: receiving a set of images of a scene from different perspectives; receiving a sensor dataset (e.g., acoustic sensor, tracking sensor, etc.) measuring sensor data associated with one or more subjects in the scene; determining a feature associated with one or more subjects from the scene based on the sensor data; aligning or overlapping the feature; and optionally displaying a lightfield image that includes the aligned images. For instance, a subject who is speaking can be identified from the sensor data (e.g., using voice recognition, using voice triangulation, by tracking movement of the subject's mouth, etc.), where features associated with the speaking subject can be determined (with or without determining features for other subjects or objects). In the third illustrative example, the features are preferably aligned without knowing a depth associated with the features and/or without generating a render of the scene and/or subjects. However, the features can be aligned (e.g., alignment refined) by determining a depth and/or render.

Figure 7:
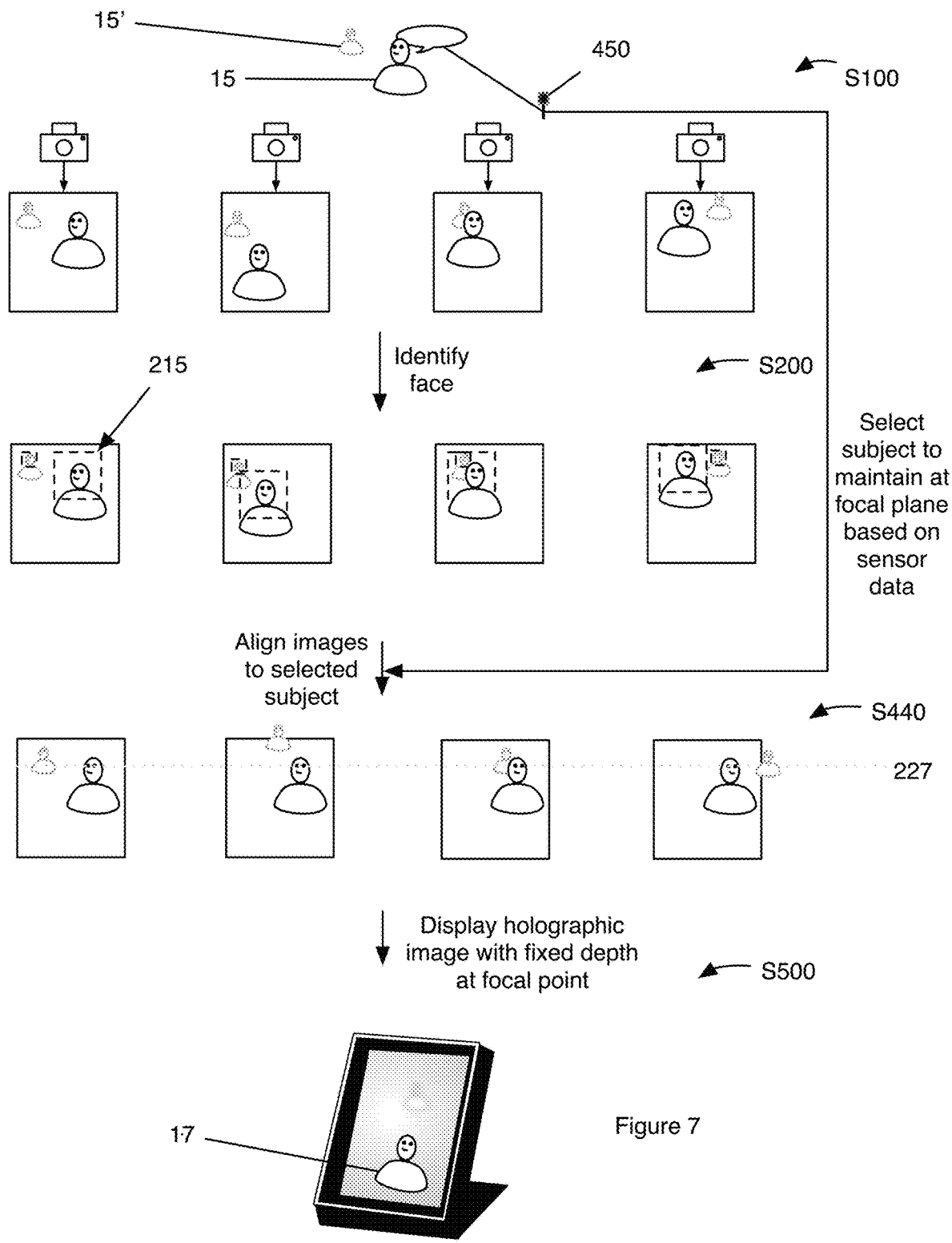
FIG. 7 is a schematic representation of an example of selecting a feature (e.g., a subject, a feature of a subject, etc.) based on a sensor reading.

In a fourth illustrative example, as shown for instance in FIG. 7, a method can include: acquiring a set of images of one or more subjects; contemporaneously with acquiring the set of images, acquiring sensor data (e.g., microphone data including speech from one or more subjects); identifying a subject of the one or more subjects that is active (e.g., speaking, gesturing, presenting, moving, etc.) based on the sensor data; determining feature(s) associated with the identified subject; aligning the features across the set of images (e.g., by setting a disparity of the feature(s) to be near zero between each image); and optionally displaying a lightfield image generated from the set of images (where the features are aligned). In the fourth illustrative example, the features are preferably aligned without knowing a depth associated with the features and/or without generating a render of the scene and/or subjects. However, the features can be aligned (e.g., alignment refined) by determining a depth and/or render.

Figure 8A:
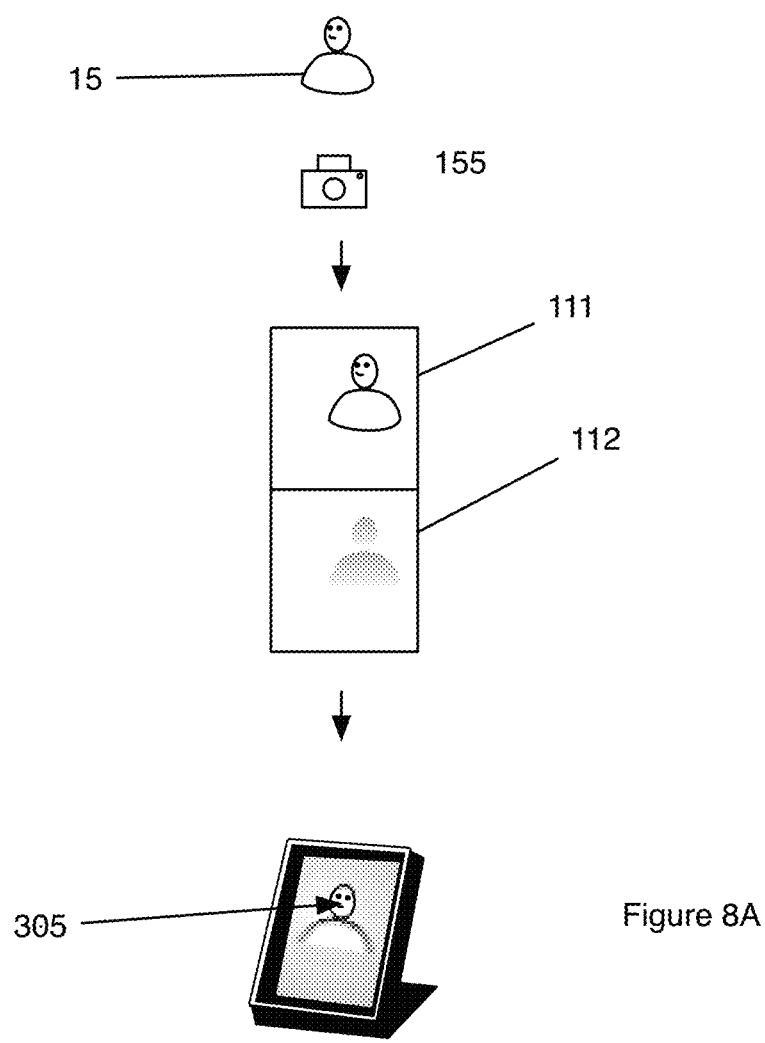
FIGS. 8A-8B are schematic representations of examples of aligning and setting a focus of a lightfield image where the constituent images include an associated depth.

In a fifth illustrative example, as shown for instance in FIG. 8A, a method can include: acquiring an image using a depth camera (e.g., a color image and associated depth map such as RGB-D image); determining a feature within the image; setting a focal plane (e.g., depth) of the feature to match a display focal plane; generating one or more views (e.g., from different perspectives based on the depth image 112); and optionally displaying a lightfield image using the depth image (and generated views).

Figure 8B:
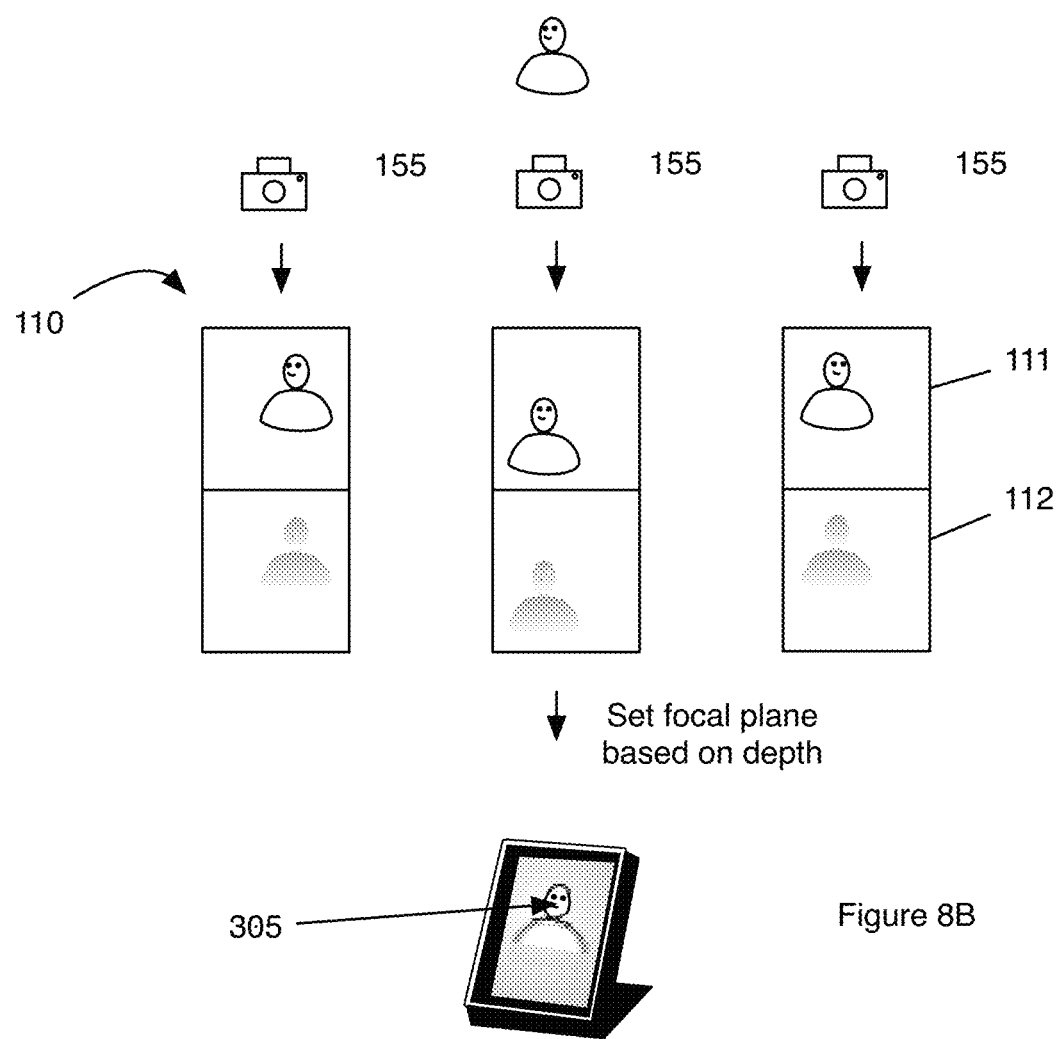

In a variation of the fifth illustrative example, as shown for instance in FIG. 8B, a plurality of depth images can be acquired, where a common feature can be determined in each image and aligned to the focal plane. In another variation of the fifth illustrative example, the depth associated with an image can be determined (e.g., using machine learning, using stereoscopic techniques, etc.). The fifth illustrative example and variations thereof can be beneficial for (and/or include) generating a rendering of the scene (e.g., a mesh representation) by combining images.

In a sixth illustrative example, any or all of the aspects of any one or more of the preceding five examples (including variations thereof) can be combined and/or used.

In an illustrative example of a lightfield communications device,

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A lightfield communication system comprising:
   a plurality of cameras configured to capture a plurality of images of a subject contemporaneously, a field of view of each camera of the plurality comprising a distinct perspective of the subject;
   a feature module configured to identify a common feature in each of the plurality of images;
   an alignment module configured to align each of the plurality of images based on the common feature; and
   a display comprising:
      a light source;
      a lenticular lens optically coupled to the light source that, with the light source, generates a light output having viewing angle dependency; and
      an optical volume optically coupled to the lenticular lens.

2. The lightfield communication system of claim 1, wherein the common feature comprises a face region of the subject.

3. The lightfield communication system of claim 1, wherein the alignment module aligns the plurality of images without a depth of an image of the plurality of images.

4. The lightfield communication system of claim 1, wherein the alignment module is further configured to: determine a crop region for each image of the plurality of images associated with the common feature; and crop each image to the associated crop region.

5. The lightfield communication system of claim 1, wherein the alignment module is configured to align each of the plurality of images using an inverse homography matrix transformation.

6. The lightfield communication module of claim 1, further comprising a communication module configured to transmit the plurality of aligned images to a second display, wherein the second display is configured to display the plurality of aligned images as a lightfield image.

7. The lightfield communication system of claim 6, wherein the second display is configured to display the lightfield image without generating a render using the plurality of aligned images.

8. The lightfield communication system of claim 6, wherein the second display comprises a tracking sensor configured to determine a gaze of a viewer, wherein the common feature is further identified based on the gaze of the viewer.

9. The lightfield communication system of claim 6, wherein the feature module and alignment module are collocated with the plurality of cameras.

10. The lightfield communication system of claim 1, wherein the common feature is identified and the plurality of images are aligned within at most 17 ms.

11. The lightfield communication system of claim 1, wherein the feature module is configured to identify the common feature using machine learning techniques.

12. The lightfield communication system of claim 1, wherein the plurality of images comprise a second subject, wherein the feature module is configured to detect a second common feature associated with the second subject, wherein the alignment module is further configured to determine an alignment based on the common feature and the second common feature.

13. The lightfield communication system of claim 12, further comprising a sensor configured to detect an action of at least one of the first or second subject, wherein the alignment is determined based on the detected action.

14. A method for generating a lightfield image comprising:
   receiving a plurality of images, each image of the plurality of images capturing different perspectives of a shared scene;
   determining a shared feature in each image of the plurality of images;
   setting the shared feature to an approximately zero disparity position between each image of the plurality of images; and
   displaying the plurality of images as a lightfield image in a display, wherein the lightfield image is perceived as three dimensional by one or more viewers, wherein the shared feature is in a focal plane of the display.

15. The method of claim 14, wherein the shared feature comprises a face region of a subject in the shared scene.

16. The method of claim 14, wherein the lightfield image is perceivable as three dimensional by the one or more viewers without using headgear.

17. The method of claim 14, wherein the shared feature is set to approximately zero disparity position without determining a depth of the shared feature in any of the plurality of images.

18. The method of claim 17, wherein setting the shared feature to the approximately zero disparity position comprises, for each image of the plurality of images:
   determining a bounding box surrounding the shared featured, wherein the shared feature is centered within the bounding box; and
   cropping the image, wherein the cropped image only includes information within the bounding box.

19. The method of claim 14, wherein determining the shared feature comprises using machine learning to determine the shared feature.

20. The method of claim 19, further comprising tracking a gaze of the one or more viewers, wherein the gaze is used to determine the shared feature.

21. The method of claim 14, further comprising tracking a subject in the shared scene, wherein determining the shared feature comprises using a tracking information to determine the shared feature.

22. The method of claim 14, wherein determining the shared feature and setting the shared feature to the approximately zero disparity position is performed within 17 ms.

* * * * *